US012110735B2

(12) United States Patent
Micheelsen et al.

(10) Patent No.: US 12,110,735 B2
(45) Date of Patent: Oct. 8, 2024

(54) BUILDING APERTURE COVER FRAME

(71) Applicant: VKR Holding A/S, Hørsholm (DK)

(72) Inventors: Steen Langdal Rønnow Micheelsen, Hørsholm (DK); Willibrordus Servatius Bouwens, Hørsholm (DK); Peter Jean Claude Gadgaard Tønning, Hørsholm (DK)

(73) Assignee: VKR HOLDING A/S, Horsholm (DK)

( * ) Notice: Subject to any disclaimer, the term of this patent is extended or adjusted under 35 U.S.C. 154(b) by 55 days.

(21) Appl. No.: 17/951,404

(22) Filed: Sep. 23, 2022

(65) Prior Publication Data

US 2023/0094589 A1 Mar. 30, 2023

(30) Foreign Application Priority Data

Sep. 28, 2021 (EP) ..................................... 21199414

(51) Int. Cl.
*E06B 3/22* (2006.01)
*E06B 1/30* (2006.01)
(Continued)

(52) U.S. Cl.
CPC .................. *E06B 3/24* (2013.01); *E06B 1/30* (2013.01); *E06B 3/26345* (2013.01); *E06B 2003/226* (2013.01); *E06B 2003/26378* (2013.01)

(58) Field of Classification Search
CPC .......... E06B 3/221; E06B 3/105; E06B 3/222; E06B 3/24; E06B 3/223; E06B 3/26345;
(Continued)

(56) References Cited

U.S. PATENT DOCUMENTS 3,507,073 A * 4/1970 Wegefelt .................. E05D 15/48
49/390
4,492,063 A * 1/1985 Schock .................... E06B 3/221
52/745.15
(Continued)

FOREIGN PATENT DOCUMENTS

DE 29923241 U1 8/2000
DE 102005048992 A1 * 4/2007 ............. E06B 3/221
(Continued)

*Primary Examiner* — Kyle J. Walraed-Sullivan
(74) *Attorney, Agent, or Firm* — CANTOR COLBURN LLP

(57) ABSTRACT

A building aperture cover frame, such as a window frame, having at least one frame profile for framing an insulated glass unit, where the frame profile includes an insulating core of insulating polyurethane foam core material enclosed by a core surface of the insulating core, where the insulating polyurethane foam core material having at least 85% by weight polyurethane, and where the insulating polyurethane foam core material is of a material density of less than 60 kg/m³, such as less than 50 kg/m³, preferably less than 40 kg/m³, a profile shell encapsulating the insulating core and having an inner shell surface facing the core surface, where the profile shell is made of at least 90% by weight polyurethane, and where the profile shell is of a material density of at least 600 kg/m³, such as at least 750 kg/m³, preferably at least 850 kg/m³, and one or more metal reinforcement element(s) located between opposing parts of the inner shell surface and the core surface.

19 Claims, 7 Drawing Sheets

Figure 1:
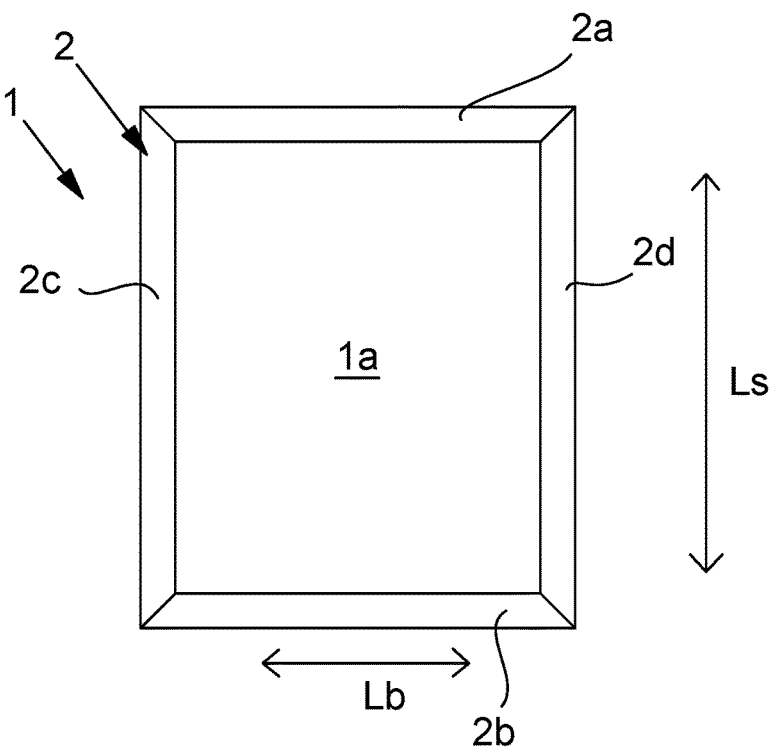

(51) Int. Cl.
*E06B 3/24* (2006.01)
*E06B 3/263* (2006.01)

(58) Field of Classification Search
CPC ......... E06B 2003/224; E06B 2003/225; E06B 2003/226; E06B 2003/227; E06B 2003/26327; E06B 2003/26378; E06B 1/30

See application file for complete search history.

(56) References Cited

U.S. PATENT DOCUMENTS

| | | | | |
|---|---|---|---|---|
| 4,831,804 A * | 5/1989 | Sayer | ............... | E06B 3/5842 52/204.593 |
| 4,977,722 A * | 12/1990 | Taylor | ............... | E06B 3/223 52/843 |
| 5,012,616 A * | 5/1991 | Martin | ............... | E06B 5/003 49/501 |
| 5,398,446 A * | 3/1995 | Kunert | ............... | E06B 3/6715 49/153 |
| 5,634,306 A * | 6/1997 | Riegelman | ............... | E06B 3/205 52/656.1 |
| 6,148,563 A * | 11/2000 | Roche | ............... | E05C 17/24 49/501 |
| 10,202,794 B1 * | 2/2019 | Careri | ............... | E06B 1/34 |
| 2010/0107497 A1 * | 5/2010 | Hulst | ............... | E06B 3/721 49/501 |
| 2011/0011006 A1 * | 1/2011 | Wuest | ............... | E06B 3/221 49/506 |
| 2011/0308180 A1 * | 12/2011 | Kolzer | ............... | E06B 3/26345 52/309.4 |
| 2012/0028027 A1 * | 2/2012 | Hortrich | ............... | E06B 3/263 264/250 |
| 2014/0186556 A1 * | 7/2014 | Dear | ............... | E06B 3/6612 428/34 |
| 2014/0259942 A1 * | 9/2014 | Koed | ............... | E06B 1/36 49/506 |
| 2016/0097235 A1 * | 4/2016 | Curcija | ............... | E06B 3/263 52/656.5 |
| 2017/0240738 A1 * | 8/2017 | Ehrlichmann | ............... | C08L 27/06 |
| 2018/0148551 A1 * | 5/2018 | Goeschel | ............... | C08G 18/4854 |
| 2019/0078376 A1 * | 3/2019 | Callaghan | ............... | E06B 1/70 |
| 2021/0025220 A1 * | 1/2021 | Capoferri | ............... | E05D 7/084 |
| 2021/0372194 A1 * | 12/2021 | Schmiedeknecht | ............... | E06B 3/22 |
| 2023/0175310 A1 * | 6/2023 | Kalverkamp | ............... | E06B 3/5821 52/204.5 |

FOREIGN PATENT DOCUMENTS

GB  2287491 A  9/1995
WO  2011104280 A1  9/2011

* cited by examiner

BUILDING APERTURE COVER FRAME

CROSS REFERENCE TO RELATED APPLICATION

This application is related to and claims the benefit of European Patent Application Number 21199414.0 filed on Sep. 28, 2021, the entire contents of which are incorporated herein by reference.

TECHNICAL FIELD

The invention relates to a frame profile for a building aperture cover frame, to a building aperture cover frame with such frame profile and to a method for making a frame profile.

BACKGROUND

Manufacturing of aperture covers for buildings, e.g. windows, has been the subject of development over many years where one of the major development goals has been to increase the insulation properties of the cover. In regards to windows as aperture covers, this has among others been achieved by developing windows with improved heat insulation properties by e.g. providing windows comprising multiple glass sheets spaced apart by insulating gaps, such as gaps comprising an inert gas. Other solutions comprise providing a vacuum insulated glass unit where one or more evacuated gaps are placed between glass sheets of the window. Additionally, the window frame has been subject to development in order to increase the insulation properties of the frame e.g. by developing the structure, design as well as the materials used in providing the frame structure.

In pursuit to improve the insulating properties of the window, constrains exist in regards to the stability and integrity, which properties the frame structure also has to provide.

Patent document no. GB2287491A discloses a window frame with a frame profile comprising a foam core as insulating material which is made of e.g. of plastic material and further comprising stiffeners in the frame profile in order to increase the rigidity of the frame and reduce bowing.

Additionally, an increased focus on the environmental burden resulting from the processes such as the manufacture, distribution and recycling of the aperture cover further calls for improved environmental friendly aperture covers.

The present disclosure provides a solution that may help providing a more environmental friendly building aperture cover, e.g. window, which additionally provides a good heat insulation and adequate structural strength. For example, the present disclosure provides a solution that may provide advantages in relation to recycling when the window should be scrapped and/or a solution that may help to provide an advantageous total carbon footprint ($CO_2$ eq/kg) of the window.

BRIEF DESCRIPTION OF THE INVENTION

Some designs and/or materials for window production may provide an undesirable high $CO_2$ footprint during manufacturing, distribution and/or recycling of the window. The present inventors have found that the combined effect of selected types of insulation material, shell material and specific uses of reinforcement elements in the frame of windows for buildings may result in a rather significant impact on the amount of the total $CO_2$ footprint of the window during the overall life cycle of the window.

For example, complex frame designs incorporating different materials may typically be difficult to separate into individual material types upon recycling of the frame, and can require a complex recycling process producing a large energy consumption in order to produce recycled end products. This in turn increases the overall carbon footprint ($CO_2$ eq/kg) provided by the frame profile. Such complex frame designs may include shell/and core material of mixed materials so as to reinforce, colour or otherwise modify the material to obtain certain material properties.

The inventors have found that polyurethane material provides good thermal insulation, good recyclability, is stable at high temperatures, such as 100 degrees Celsius, and can be readily modified to provide solid and foam material of high or low flexibility, such that the same material can be produced to provide the structural rigidity needed for the shell and the insulating properties, i.e. a low thermal conductivity coefficient (2) needed for the insulating core. In turn, as the manufacturing process is simplified the amount of energy consumption and carbon footprint ($CO_2$ eq/kg) of the processing to obtain the final insulated frame product can be reduced.

Additionally, as polyurethane (PUR) may both provide the shell material and insulating core material, it allows for easy recyclability of the frame, as the shell and insulating core material may be recycled as the same material and along the same recycling routes, thereby decreasing the complexity of the recycling process and the overall carbon footprint ($CO_2$ eq/kg) of the frame profile. The recyclability of the frame product comprising PUR core material and PUR shell material may in particular be improved compared to frame products made of combined materials, such as PUR shell and wood core or PUR shell and EPS (expanded polystyrene) core.

The first aspect of the present invention relates to a building aperture cover frame, such as a window frame, comprising at least one frame profile for framing an insulated glass (IG) unit, wherein the frame profile comprises
  an insulating core of insulating polyurethane (PUR) foam core material enclosed by a core surface of the insulating core, wherein the insulating polyurethane (PUR) foam core material comprises at least 85% by weight polyurethane, and
    wherein the insulating polyurethane foam core material is of a material density ($\delta_{core}$) of less than 60 kg/m$^3$, such as less than 50 kg/m$^3$, preferably less than 40 kg/m$^3$,
  a profile shell encapsulating the insulating core and comprising an inner shell surface facing the core surface, wherein the profile shell is made of at least 90% by weight polyurethane, and
    wherein the profile shell is of a material density ($\delta_{shell}$) of at least 600 kg/m$^3$, such as at least 750 kg/m$^3$, preferably at least 850 kg/m$^3$,
  one or more metal reinforcement element(s) located between opposing parts of the inner shell surface and the core surface.

By the present invention, a frame profile of low carbon footprint, high structural strength and thermal insulation capabilities and of high recyclability is provided. As the purity of the polyurethane (PUR) materials are high, the recyclability of the individual elements can readily be obtained. In one or more embodiments, the high density PUR profile shell ensures sufficient strength to retain the PUR foam core material if the core is foamed.

In one or more embodiments, the profile shell relates to the body of the shell element, on which body, i.e. the profile shell, further layers of material, e.g. coating(s), may be applied, such as a foil finish and/or layer(s) of paint. In one or more embodiments, the profile shell comprises an inner shell surface directed towards and surrounding a shell cavity of the profile shell and an outer shell surface arranged opposite to an inner shell surface and directed away from the cavity, such as towards the outside of the cavity, preferably the outer shell surface provides the exterior, outermost boundary of the profile shell. In one or more embodiments, the outer shell surface is separated from the cavity by the PUR content of the profile shell itself, and e.g. the outer shell surface is not abutting the cavity. Further layers of material, as mentioned above, may be applied onto the outer shell surface.

In one or more embodiments, the insulating core is made of at least 80%, such as at least 85%, such as at least 88%, such as at least 90%, such as at least 93%, such as at least 95%, such as at least 97%, or such as at least 99% polyurethane. The insulating core may comprise between 80% and 97%, preferably between 85% and 95% polyurethane. In one or more embodiments, at least 5%, such as between 2% and 15% or such as between 3% and 10% of the insulating core may consist of one or more compounds different to PUR, such as mold release agent(s) and/or cell-gas and/or blowing agent(s) provided during the manufacture of the foam core. The cell-gas may be originating from or produced by the blowing agent during foaming. In one or more embodiments, the insulating core is devoid of blowing agent and/or cell-gas and/or mould release agent.

In one or more embodiments, the PUR foam core material may include blowing agents or cell-gas, such as pentane, e.g. contained in a closed-cell foam structures, and the PUR foam core material may comprise at least 80%, such as at least 85%, such as at least 88%, such as at least 90%, such as at least 93%, such as at least 95%, such as at least 97%, or such as at least 99% polyurethane. The PUR foam core material may preferably comprise less than 95% polyurethane.

In one or more embodiments, the profile shell is made of at least 90%, such as at least 93%, such as at least 95%, such as at least 98%, or such as 100% polyurethane. The profile shell may comprise between 90-100% polyurethane, preferably between 98% and 100% polyurethane. By making the profile shell and the insulating core of the same material, the frame becomes easier to recycle.

In one or more embodiments, the difference in polyurethane content in the profile shell compared to polyurethane content of the insulating core differs by less than 10% by weight, such as less than 5% by weight or such as less than 2% by weight. As the PUR content of both the insulating core and the profile shell is both relatively high and relatively equal, the materials of the profile shell and the insulating core may be recycled together, e.g. along the same recycling route and according to the same recycling process.

In one or more embodiments, the core surface surrounds the insulating core and the is outermost boundary of the insulating core and is defined by the polyurethane material, i.e. the core surface of the insulating core is of the same material as the remainder of the insulating core. The insulating core may be cut from a block of insulating core material or may be formed in a mould.

In one or more embodiments, the polyurethane used is made from polyols and isocyanates. Optionally, mould release agents may be added, however preferably, the foam core may be devoid of mould release agents. In one or more embodiments, the foam includes one or more blowing agents, such as pentane.

Typically, the profile shell is mainly configured to add structural strength to the frame profile, while the insulating core is mainly configured to provide insulating properties. Advantageously, by the present invention including the specified polyurethane densities, the frame profile is of sufficient structural strength and insulating properties for a building aperture cover frame. The profile shell is preferably additionally configured with surface properties for the addition of paint, e.g. adherent paint, to achieve a more maintenance-free product, e.g. the outer profile shell surface is preferably smooth.

In one or more embodiments, the profile shell is of a material density ($\delta_{shell}$) of between 600-1200 kg/m$^3$, such as between 750-1050 kg/m$^3$, preferably between 850 and 950 kg/m$^3$.

In one or more embodiments, the profile shell is of a material density ($\delta_{profile\ shell}$) of less than 1200 kg/m$^3$, such as less than 1050 kg/m$^3$, preferably less than 950 kg/m$^3$. In one or more embodiments, the polyurethane profile shell is of a density of about 900 kg/m$^3$.

In one or more embodiments, the insulating polyurethane foam core material is of a material density ($\delta_{core}$) between 20-60 kg/m$^3$, such as between than 30-50 kg/m$^3$, preferably between 35-45 kg/m$^3$.

In one or more embodiments, the insulating polyurethane foam core material is of a material density ($\delta_{core}$) of at least 20 kg/m$^3$, such as at least 30 kg/m$^3$, preferably at least 35 kg/m$^3$. In one or more embodiments, the polyurethane core is of a density of about 40 kg/m$^3$.

In one or more embodiments, a building aperture cover frame may be provided by assembling the frame profile as per the present disclosure with other building aperture cover frame profiles, or with one or more further frame profiles as per the present disclosure, e.g. so as to provide a frame surrounding a rectangular or square frame opening arranged to accommodate a glass unit, such as an insulated glass (IG) unit or a vacuum insulated glass (VIG) unit. The building aperture cover frame may be suitable for any glass unit, in particular IG and/or VIG units.

In one or more embodiments, the glass unit comprises a first outer major surface for facing the interior of a building, and a second outer major surface for facing away from the interior of a building, when the building aperture cover frame with the glass unit is installed in an aperture of a building. The frame profiles providing the frame may each having a longitudinal direction arranged to extend parallel to a side surface of the glass unit, the side surface may be extending from the first outer major surface towards the second outer major surface of the glass unit.

In one or more embodiments, the profile shell according to the present invention encloses an inner shell cavity or space, e.g. enclosed by profile shell, which may be made up by one or more profile shell walls.

In one or more embodiments, one or more metal reinforcement element may be arranged in the inner shell cavity, e.g. in or on the insulating core, e.g. either fully or partly in or on the insulating core.

In one or more embodiments, the metal reinforcement element may be of any suitable orientation and/or shape for strengthening the frame profile, e.g. the metal reinforcement element may be a bar, plate, profile, rod, wire, and/or grid etc. The metal reinforcement element(s) may be oriented at an angle to the long dimension of the frame profile, e.g. the metal reinforcement element may be plate that is not "flat" but rather angled in the cross section of the frame profile.

In one or more embodiments, the metal reinforcement element(s) are made of steel, such as, phosphate coated steel.

Steel reinforcements have good recycle properties and a favourable carbon footprint to strength ratio. Advantageously, phosphate coated steel increases the bonding capability between the PUR material and the reinforcement element(s). The metal reinforcement elements may additionally or alternatively be made of or comprise another metal such as aluminium or iron.

In one or more embodiments, the metal reinforcement element(s), such as the entire metal reinforcement element(s), are located at the interface between the profile shell and the insulating core, e.g. on the core surface and/or the inner shell surface.

In one or more embodiments, the opposing parts of the inner shell surface and the core surface are neighbouring parts and the closest parts of the inner shell surface and the core surface.

The inventors have found by layering the different material types of the frame profile on top of each other instead of embedding them in to each other, e.g. by embedding the metal reinforcement element in the insulating core, it may increase the recyclability of the frame, as the different materials may be more readily separated. The recyclability of the frame profile may thereby be increased by the structural design of the frame profile. Advantageously, by the present invention including the specified polyurethane densities, the frame profile may be of sufficient structural strength and insulating properties for a building aperture cover frame, even without having to embed reinforcements, such as metal reinforcement elements and/or fibres, within the profile shell or within the insulating core.

In one or more embodiments, the one or more metal reinforcement element(s) may be located between opposing parts of the inner shell surface and the core surface, along the inner shell surface, wherein opposite to the inner shell surface an outer shell surface is arranged, which outer shell surface is a part of the exterior outermost shell surface of the shell profile. The exterior outermost shell surface may be thought of as the profile shell surface exposed to the outside. In one or more embodiments, the metal reinforcement element is arranged to extent substantially parallel to an adjacent, e.g. most proximate, core surface and/or inner profile shell surface and/or outer profile shell surface, such as an outermost exterior shell surface being proximate to the metal reinforcement element.

In one or more embodiments, the reinforcement element is structurally attached to and/or substantially abuts an inner shell surface of the profile shell, where said inner surface faces the shell cavity.

In one or more embodiments, the metal reinforcement element may be arranged adjacent, e.g. neighbouring, abutting and/or adhered to an inner shell surface of the profile shell, wherein the inner shell surface is a part of a profile shell wall, which further comprises an outer shell surface arranged opposite the inner shell surface, wherein the outer wall surface may be an exterior outermost wall surface of the profile shell.

Advantageously, by placing the metal reinforcement element in the cavity and nearest the outermost walls of the profile shell, the metal reinforcement element may more readily strengthen the profile shell aid in providing stability to the frame profile, e.g. by reducing the amount of bending, bowing and/or twisting of the frame profile.

In one or more embodiments, some or each of metal reinforcement elements are preferably arranged at maximum distance from the longitudinal centre axis of the frame profile, so as to increase the reinforcement effect provided.

In one or more embodiments, the metal reinforcement element(s) are located on the core surface, e.g. attached by adhesion to the core surface. This has the effect of increasing the recyclability of the frame profile, as the metal reinforcement element may be more readily located and separated from the PUR material. The core surface may be the core surfaces nearest and opposite an exterior outermost wall surface of the profile shell.

In one or more embodiments, the metal reinforcement element(s) may comprise a first reinforcement surface facing and arranged adjacent to the core surface and an opposite second reinforcement surface facing and arranged adjacent to the inner shell surface, e.g. such that the metal reinforcement element is sandwiched therein between. Preferably, the majority of the second reinforcement surface, such as at least 90% or at least 95%, or the entire second reinforcement surface is covered by the profile shell.

Additionally or alternatively, the metal reinforcement element(s) may comprise a first reinforcement surface facing and arranged adjacent to the core surface and an opposite second reinforcement surface facing and arranged adjacent to the core surface, e.g. such that the metal reinforcement element is sandwiched between opposing parts of the core surface, E.g. the reinforcement element may be provided in a recess of the insulating core.

In one or more embodiments, the insulating core may be provided as one or more separate core parts, such as core parts cut from a board of PUR insulating foam material. Each core part may comprise an enclosing core surface.

In one or more embodiments, the reinforcement element(s) may be arranged between two or more core parts and comprising a first reinforcement surface facing and arranged adjacent to a first core surface of a first core part and an opposite second reinforcement surface facing and arranged adjacent to a second core surface of a second core part, e.g. such that the metal reinforcement element is sandwiched therein between.

In one or more embodiments, the metal reinforcement element(s) are arranged at an angle within the profile shell, such as diagonally in a transverse cross-sectional view of the profile shell. The metal reinforcement element may be arranged in the frame profile, such that the majority, e.g. at least 50%, of the major surfaces of the metal reinforcement, e.g. plate-shaped metal reinforcement, is angled with respect to the major surface(s) of the VIG unit.

In one or more embodiments, the metal reinforcement element comprises a wall part (e.g. a plate) extending in a direction away from a first region located proximate a first plane comprising the first outer major surface of the glass unit, and moreover extends in the inner shell cavity in a direction away from a second plane, so that the interior cavity is split into a first space part located at a first side of the reinforcement element, and a second space part located at a second side of the reinforcement element. The second plane is perpendicular to the first plane, extends parallel to the longitudinal direction of the frame profile, and touches a part of an outer surface of a first profile shell wall that faces and is proximate the frame opening.

This arrangement of the metal reinforcement element provides improved heat/temperature management. The metal reinforcement element enables both a heating function for heating the frame profile near the glass unit to prevent condensation issues at edge parts of the glass unit and/or the frame when it is cold outside the building where the window is installed. Furthermore, the reinforcement element may help to provide or improve transportation of heat away from the first profile shell wall that faces and is proximate the frame opening when higher temperatures are provided outside the building. The latter may e.g. be advantageous when the temperature outside the building is higher than the general temperature in the room to which the roof window provides sunlight through the glass unit, and/or in sunny conditions.

In some situations where an interior cover such as a blind or additional glass is installed at building aperture cover frame, simulations and "real life test" have shown that the temperature of the first profile shell wall may get above 90° C., and even above 100° C. in case the reinforcement element is omitted. Computer simulations however indicates an improved heat management at the first profile shell wall in a case where the reinforcement element according to the present disclosure is installed, so that the temperature at the first profile shell wall is reduced. This advantageous effect is also provided when compared to simulations where a major surface of a reinforcement element is installed to abut and extend along a profile shell wall.

In one or more embodiments, the wall part may alternatively extend towards the second plane.

In one or more embodiments, the metal reinforcement element comprises a wall part (e.g. a plate) extending in a direction away from a third region located proximate a third plane comprising a third profile shell wall that faces and is furthest towards the interior of the building, and moreover extends in the inner shell cavity in a direction away from or towards the second plane, so that the interior cavity is split into a first space part located at a first side of the reinforcement element, and a second space part located at a second side of the reinforcement element.

In one or more embodiments, the metal reinforcement element may be attached to the insulating core, such as adhered to and/or it may be embedded in the insulating core, which may be a result of foaming the insulating core on or around the steel reinforcement. Advantageously, the inventors have found that if the metal reinforcement element is made of steel, the presence of polyurethane on the steel has little impact on the recyclability of the metal, since steel can recycled as mixed waste, e.g. steel with polyurethane still arranged thereon. Recycling reinforcements of other material types typically require a significantly cleaner metal waste with no trace of polyurethane.

In one or more embodiments, the metal reinforcement element(s) are covered, preferably fully covered, e.g. by the profile shell, such that the metal reinforcement elements are not exposed to the outside environment, e.g. visible, when installed in the building aperture cover frame. E.g. the metal reinforcement elements may be entirely located inside the profile shell, between the inner shell surface and the core surface.

In one or more embodiments, the insulating core is covered, such as fully covered, e.g. by the profile shell, such that the insulating core, i.e. the core surface, is not exposed to the outside environment, e.g. visible, when installed in the building aperture cover frame.

In one or more embodiments, the entire extent of each metal reinforcement element is sandwiched between the insulating core and the profile shell.

In one or more embodiments, the metal reinforcement element(s) are sandwiched between the insulating core and the profile shell, e.g. such that a layered section of the frame profile is provided, which comprises a first layer provided by the profile shell, a second layer provided by the metal reinforcement element and a third layer provided by the insulating core, when viewed from the outermost surface of the frame profile towards the centre of the frame profile.

Advantageously, the metal reinforcement elements are arranged so that separation of the frame materials e.g. for recycling of the individual types of frame profile materials, can be more easily undertaken. E.g. the frame profile may be shredded/ground and subsequently separated and recycled into raw materials, which can be reused. The recycling process of polyurethane may involve glycolysis or pyrolysis and the metal reinforcements may be re-melted.

In one or more embodiments, the metal reinforcement elements are preferably elongated metal reinforcement elements having a longitudinal extent arranged along a longitudinal extent of the profile shell.

Advantageously, the elongated metal reinforcement element extending lengthwise in the frame profile provides increased structural strength and stability in the building aperture cover frame compared to discrete metal profile stiffeners, in particular in frames comprising a sash frame to be movably arranged relative to a fixation frame, such as in a roof window.

In one or more embodiments, the metal reinforcement elements have a longitudinal extent, which is much larger than a transverse extent of the metal reinforcement element such as at least two times larger, such as at least three times larger. In one or more embodiments, the elongated metal reinforcement element(s) may extent along the entire frame profile, e.g. along the entire profile shell and/or insulating core, or along at least 90% of the frame profile or along at least 80% or 70% of the frame profile, the longitudinal extent of the frame profile being larger than the transverse extent, such as approximately 5-10 times larger.

In one or more embodiments, at least one of the metal reinforcement elements is preferably an elongated metal reinforcement element having a longitudinal extent arranged along a longitudinal extent of the profile shell.

In one or more embodiments, metal reinforcement elements are arranged to be mutually connected, such as directly connected, with neighbouring reinforcement elements of perpendicular neighbouring frame profiles in the building aperture cover frame, e.g. metal reinforcement elements may be connected at corners of the building aperture cover frame, e.g. by using corner connectors or corner keys, so as to create a metal reinforcement frame provided by a plurality of metal reinforcement elements. A metal reinforcement frame may alternatively be provided by a one-piece metal reinforcement frame, e.g. produced in single mould. A metal reinforcement frame can potentially be beneficial in larger in frame holding large window panes of up to 60 kg in weight.

In one or more embodiments, the metal reinforcement element(s) comprises one or more metal plates. The metal plate(s) are preferably of a much larger width than thickness, e.g. the width may be larger by a factor of 2, 3, 4, 5 or more. The first reinforcement surface of the metal plate may be a first major surface, while the second reinforcement surface may the an opposing second major surface. In one or more embodiments, the metal plates are preferably elongated metal plates. In one or more embodiments, the metal plates are metal brackets, such as elongated metal brackets, e.g. comprising two or more metal reinforcement plates, also referred to as walls or legs.

In one or more embodiments, the metal reinforcement element(s) comprises one or more metal plate(s), wherein each metal plate comprises a major surface arranged in parallel with an opposing part of the inner shell surface.

In one or more embodiments, the major surface may be the second major surface directed towards, i.e. facing the inner shell surface. In one or more embodiments, the metal reinforcements element is provided between the profile shell and the core such that a first major surface of the metal plate(s) is facing and in parallel with the core surface and such that a second major surface of the metal plate(s) is facing and in parallel with the inner shell surface, wherein the first and second major surfaces are preferably located on opposing sides of the metal plate separated by the thickness of the metal plate.

In one or more embodiments, one or more reinforcement element(s), such as one or more metal plate(s), comprises one or more bend(s).

In one or more embodiments, one or more reinforcement element(s) may comprise one or more bends provided by one or more connected metal plates, e.g. plate-shaped metal plates, i.e. planar metal plates. Alternatively or additionally, the one or more bends may be provided by bending metal, e.g. by standard metal fabrication presses.

In one or more embodiments, the metal reinforcement element(s) may be angle bar(s), be corner-shaped, such as L-shaped, e.g. so as to fit a corner of the insulating core. The metal reinforcement element may also be of other shapes, such as U-shaped, e.g. so as to fit two corners of the insulating core or such as S-shaped. In one or more embodiments, the frame profile may comprise metal reinforcement elements of different shapes. The different shapes of the reinforcement profiles can provide different strengths characteristics to the frame profile, e.g. they may be designed to mainly reduce twisting, bowing, buckling and/or bending of frame profile.

In one or more embodiments, the frame profile comprises a plurality of metal reinforcement elements, wherein at least some of the metal reinforcement elements are of different shapes comprising L-shaped, U-shaped, S-shaped and/or plate-shaped.

In one or more embodiments, the frame profile comprises a plurality of reinforcement elements, preferably discretely placed and separated by the insulating core and/or the profile shell. By separating the metal reinforcement elements thermal conduction between the discrete metal reinforcement element can be reduced or prevented, in particular if the elements are separated by insulating material.

In one or more embodiments, the frame profile may comprise a first metal reinforcement element arranged at a first section, e.g. side or corner, of the core surface, e.g. a first section being configured to be directed towards the inside of the building in which the building aperture cover frame is to be installed, and a second metal reinforcement element arranged at a second section, e.g. side or corner, of the core surface, e.g. a second section being configured to be directed towards the outside of the building in which the building aperture cover frame is to be installed, wherein the first section is opposite the second section of the insulating core.

In one or more embodiments, the frame profile may comprise a first metal reinforcement element arranged at a first corner of the core surface, e.g. a first corner being configured to be directed at least partly towards the inside of the building in which the building aperture cover frame is to be installed, and a second metal reinforcement element arranged at a second corner of the core surface, e.g. a second corner being configured to be directed at least partly towards the outside of the building in which the building aperture cover frame is to be installed, wherein the first corner is opposite or diagonal to the second corner of the insulating core.

In one or more embodiments, the metal reinforcement element(s) are of a reinforcement thickness of less than 3.0 mm, such as less than 2.0 mm, such as less than 1.5 mm, such as less than 1.2 mm, such as less than 1.0 mm, or such as less than 0.8 mm, wherein the thickness may be measured between the first and second metal reinforcement surfaces and along a line perpendicular to these surfaces, e.g. between an inner and outer metal reinforcement surface and/or a first and second major surface of the metal reinforcement. In one or more embodiments, the metal reinforcement element comprises a metal reinforcement plate, wall or leg comprising a first metal reinforcement surface and an opposing second metal reinforcement surface being the major surfaces of the plate, wall or leg.

In one or more embodiments, the metal plate(s) are of a reinforcement thickness of less than 3.0 mm, such as less than 1.5 mm, or such as less than 1.0 mm. In one or more embodiments, the reinforcement thickness may be between 0.5 mm and 2.0 mm, such as between 1.0 mm and 1.5 mm.

In one or more embodiments, the metal plate(s) are of a reinforcement thickness of less than 2.0 mm, such as less than 1.2 mm, preferably less than 0.8 mm.

Advantageously, by the present invention, relatively small amount of metal reinforcement is required to provide adequate strength to the frame profile for the building aperture cover frame, e.g. of the stated profile shell densities, which in turn reduces overall thermal conductivity, material cost for the frame profile and reduces the overall carbon footprint of the frame product.

In one or more embodiments, at least 80%, such as at least 90%, such as at least 95% of all or some metal reinforcement elements, e.g. metal plates, are of reinforcement thickness of less than 3.0 mm, such as less than 2.0 mm, such as less than 1.5 mm, such as less than 1.2 mm, such as less than 1.0 mm or such as less than 0.8 mm.

In one or more embodiments, the metal reinforcement elements may comprise one or more metal plates, each providing a wall part or leg of the metal reinforcement, wherein each wall part or leg may be of a length between 4 mm and 20 mm, such as between 6 mm and 18 mm, such as between 8 mm and 16 mm, wherein the length is measured along the longitudinal extent of the metal reinforcement element arranged to be substantially parallel to the longitudinal extent of the frame profile when arranged therein.

In one or more embodiments, the metal reinforcement elements are attached to core surface and/or the profile shell by an adhesive. Adhesive may increase the structural strength of the frame profile and decrease the risk of bowing or twisting of the frame profile, especially with reduced profile shell thicknesses, reduced amount of metal reinforcement and/or reduced PUR densities.

In one or more embodiments, the metal reinforcement elements are attached to the core surface by an adhesive preferably comprising at least 50% by weight polyurethane, such as at least 70% by weight polyurethane, preferably at least 85% by weight polyurethane.

In one or more embodiments, the metal reinforcement element(s) are attached to the profile shell by an adhesive preferably comprising at least 50% by weight polyurethane, such as at least 70% by weight polyurethane, preferably at least 85% by weight polyurethane.

Advantageously, the polyurethane (PUR) adhesive increases recyclability of the frame profile in that it can be categorized as being majorly of the same or similar material as the insulating core/profile shell. This reduces the process steps in recycling the materials of the frame profile, since the adhesive may not need to be removed from the insulating core/profile shell.

In one or more embodiments, the polyurethane adhesive may be a one or two or more component adhesive, e.g. including resin(s) and hardener(s). The polyurethane may be a hot melt adhesive.

Additionally, the PUR adhesive provides the effect of securing the metal reinforcement element in their selected positions relative to the core/profile shell when providing the profile shell in the manufacturing the frame profile.

In one or more embodiments, the profile shell comprises a profile shell thickness of less than 3.0 mm, such as less than 2.0 mm, such as less than 1.5 mm, preferably less than 1.0 mm.

In one or more embodiments, the profile shell thickness may be less than 2.5 mm, such as less than 1.8 mm, such as less than 1.1 mm, preferably less than 0.7 mm.

In one or more embodiments, the profile shell is of a profile shell thickness between 0.25 mm and 8.0 mm, such as between 0.5 and 6 mm, or such as between 0.5 and 5 mm. The profile shell thickness may be measured from the inner shell surface to an opposing outer profile shell surface of the profile shell, preferably along a line perpendicular to the inner shell surface, e.g. the profile shell thickness may be a wall thickness of a profile shell wall comprising the inner and outer shell surface. In one or more embodiments, the outer shell surface is an outermost, exterior shell surface of the profile shell.

In one or more embodiments, at least 10%, such as at least 20%, or such as at least 30% of the profile shell is of a profile shell thickness of less than 3.0 mm, such as less than 2.0 mm, such as less than 1.5 mm, or such as less than 1.0 mm.

In one or more embodiments, at least 25%, such as at least 50%, such as at least 65% or such as at least 75% of the profile shell is of a profile shell thickness of less than 3.0 mm, such as less than 2.0 mm, such as less than 1.5 mm, or such as less than 1.0 mm.

In one or more embodiments, at least 85%, such as at least 90%, or such as at least 95% of the profile shell is of a profile shell thickness of less than 3.0 mm, such as less than 2.0 mm, such as less than 1.5 mm, or such as less than 1.0 mm.

In one or more embodiments, between 10% and 90%, such as between 20% and 80%, or such as between 30% and 70% or such as between 40% and 60% of the profile shell is of a profile shell thickness of less than 3.0 mm, such as less than 2.0 mm, such as less than 1.5 mm, or such as less than 1.0 mm.

By the profile shell thicknesses of the above one or more embodiments, the invention provides a frame profile requiring small amounts of PUR material in at least some parts of the profile shell. This decreases the overall cost and carbon footprint of the frame profile.

In one or more embodiments, the profile shell has a first profile shell thickness of less than 3 mm, such as less than 2 mm, such as less than 1.5 mm or such as less than 1 mm, and a second profile shell thickness, which is between 2 and 8 times larger than the first profile shell thickness, such as between 2 and 6 times larger, or such as between 2 and 4 times larger than the first profile shell thickness.

In one or more embodiments, between 10% and 90%, such as between 15% and 85%, or such as between 20% and 80% of the profile shell is of a first profile shell thickness while between 10% and 90%, such as between 15% and 85%, or such as between 20% and 80% of the profile shell is of a second profile shell thickness.

In one or more embodiments, between 5% and 75%, such as between 8% and 65%, or such as between 12% and 55% of the profile shell is of a first profile shell thickness, while between 25% and 95%, or such as between 35% and 92%, or such as between 45% and 88% of the profile shell is of a second profile shell thickness.

In one or more embodiments, between 1% and 50%, such as between 2% and 40%, or such as between 3% and 35% of the profile shell is of a first profile shell thickness while between 50% and 99%, such as between 60% and 98%, or such as between 65% and 97% of the profile shell is of a second profile shell thickness.

In one or more embodiments, at least the profile shell walls comprising an outermost exterior shell surface may fulfil one or more of the above embodiments stating thickness requirements for the profile shell thickness. E.g. internal cavity-contained profile shell walls may be excluded. However, preferably, one or more of the above stated thickness requirements may be valid for the entire profile shell.

In one or more embodiments, the frame profile is an elongated frame profile having an elongated profile shell and potentially also an elongated insulating core. In one or more embodiments, the profile shell is at least covering the insulating core and the metal reinforcements along the longitudinal extent of the frame profile, but preferably also at transverse ends of the frame profile. The shell covering provides increased weather protection, in turn increasing the lifetime of the frame.

In one or more embodiments, the profile shell is of a profile shell thickness, which varies in a transverse cross-section provided perpendicular to the longitudinal extent of the profile shell. E.g. the thickness may vary between 0.3 and 8 mm, such as between 0.5 and 7 mm, or such as between 0.7 mm and 6 mm.

In one or more embodiments, the profile shell is of a profile shell thickness, which varies in a longitudinal cross-section provided parallel to the longitudinal extent of the profile shell. E.g. the thickness may vary between 0.3 and 8 mm, such as between 0.5 and 7 mm, or such as between 0.7 mm and 6 mm.

In one or more embodiments, the profile shell may comprise a plurality of profile shell walls, such as 4, 5 or 6, collectively providing a polygonal transverse cross-sectional shape. The plurality of profile shell walls may comprise one or two thin profile shell walls of a thickness between 0.3 mm and 8 mm, such as between 0.5 mm and 7 mm, or such as between 0.7 mm and 6 mm.

Advantageously, the non-uniform profile shell thickness allows for increased utilization of the PUR material with decreased PUR waste, in that profile shell sections where there exist a low requirement to profile shell strength, the profile shell may be made using reduced amount of material, thereby decreasing the amount of unnecessary PUR material in the frame profile and in turn the overall frame profile cost.

In one or more embodiments, the insulating polyurethane foam core material has a thermal conductivity between 0.020 and 0.060 W/mK, such as between 0.020 and 0.040 W/mK, preferably between 0.020 and 0.030 W/mk.

In one or more embodiments, the insulating polyurethane foam core material has a thermal conductivity about 0.025 W/mk.

In one or more embodiments, the content of reinforcement material in the profile shell and/or the insulating core being different from polyurethane material is less than 5%, such as less than 4%, such as less than 3%, such as less than 2%, or such as less than 1% by weight and/or by weight per unit volume. Types of reinforcement can include fibres, such as glass fibres and/or carbon fibres.

In one or more embodiments, the content of fibres, such as reinforcement fibres, in the profile shell is less than 3% by weight and/or by weight per unit volume, such as less than 2% by weight and/or by weight per unit volume, or such as less than 1% by weight and/or by weight per unit volume.

In one or more embodiments, the content of insulating foam material being different from polyurethane foam material is less than 5% by weight and/or by weight per unit volume, such as less than 4% by weight and/or by weight per unit volume, such as less than 3% by weight and/or by weight per unit volume, such as less than 2% by weight and/or by weight per unit volume, or such as less than 1% by weight and/or by weight per unit volume.

In one or more embodiments, the content of expanded polystyrene (EPS) foam in the insulated core is less than 3% by weight and/or by weight per unit volume, such as less than 2% by weight and/or by weight per unit volume, such as less than 1% by weight and/or by weight per unit volume.

Advantageously, the low degree of foreign compounds, being different to polyurethane material, increases the recyclability of the frame. Preferably, at least 80%, such as at least 90% or such as the entire profile shell, insulating core, or both fulfils the requirement of low levels of foreign compounds.

In one or more embodiments, the profile shell is a reaction injection moulded (RIM) profile shell.

In one or more embodiments, the insulating core is a reaction injection moulded insulating core.

In one or more embodiments, the reaction injection moulding (RIM) process comprises pressure mixing at least two liquid intermediate thermoset materials (isocyanate and polyol), which are subsequently introduced into a mould, in which the materials expand and polymerize, e.g. by undergoing an exothermic chemical reaction, so as to form the moulded product, e.g. the profile shell and/or the insulating core.

This method is different to plastic injection moulding, where plastic material, typically pellets, is heated to increase the flowability prior to introducing it into the mould, and subsequently cooled in the mould to form the plastic product.

Advantageously, the reaction injection moulding process typically requires much lower applied pressures and temperatures to form the product than the plastic injection moulding process, which in turn lessens the requirements on tools used in the process and potentially lowers tooling costs. Additionally, different types of products can be provided by the RIM process, e.g. foams or solid products, flexible or rigid, depending on the selected raw materials and polyurethane reaction techniques. By using RIM, strong, dimensionally stable and yet lightweight products can be provided, which are all beneficial properties when implemented in window frames.

The lower viscosity of the mixture provided in the mould compared to the heated plastic in the plastic injection moulding process, further increases the design capabilities and design flexibility, as the mixture can more easily fill small openings in the mould, e.g. the reaction moulding process can provide thicknesses and details of dimensions down to 0.25 mm.

Advantageously, by using a reaction injection moulding process complicated design details in the profile shell may be realised, e.g. non-uniform profile shell thicknesses may be more readily produced to live up to design objects and requirements. In turn the RIM process allows for increased utilization of the PUR material with decreased PUR waste and in turn decreased overall frame profile cost.

In one or more embodiments, the RIM method provides a profile shell, which is moulded around the insulating core and metal reinforcement element(s), preferably such that the insulating core and the metal reinforcement elements are fully covered by the profile shell. Subsequently, openings in the profile shell, and optionally also the foam and/or the metal reinforcements, may be provided, e.g. as a part of a process of assembling the building aperture cover frame.

In one or more embodiments, the RIM method may provide four profiles shells, each fully encapsulating an inner cavity arranged to include the insulating core and metal reinforcement element(s). The four profiles are configured to be assembled end to end so as to provide a frame structure. An end to end connection may be enabled by a male/female connection provided by a protrusion on an end of a first profile shell shaped to allow it to be connected with a cavity on an end of a second profile shell.

In one or more embodiments, the RIM process of manufacturing the profile shell provides a bond between the insulating core and the profile shell.

In one or more embodiments, the RIM process of manufacturing the profile shell provides a bond between one or more metal reinforcements and the profile shell.

In one or more embodiments, the RIM process provides a bond between the insulating core and the reinforcement elements with the profile shell. By the RIM process the profile shell may become bonded to the insulating core and the metal reinforcement elements.

In one or more embodiments, the building aperture cover frame may be a frame for a door or a window, such as a roof window. E.g. the building aperture cover frame may provide a fixation frame configured to be fixed to a building structure, such as in an opening of a roof structure. In one or more embodiments, the building aperture cover frame may provide a sash frame configured to be movably arranged relative to a fixation frame and/or it may provide a fixation frame and/or both a sash and a fixation frame.

In one or more embodiments, the building aperture cover frame may further comprise a hinge arrangement for providing a pivot connection between a sash frame and a fixation frame. The metal reinforcement element may provide positions for fastening of fittings, e.g. by engaging the metal reinforcement element with the fittings, such as a hinge arrangement, closure or locking mechanism, either directly or indirectly via an interconnecting element of the frame, e.g. the profile shell and/or insulating core.

In one or more embodiments, the building aperture cover frame comprises a fixation frame comprising one or more frame profiles and a sash frame comprising one or more frame profiles, and wherein the sash frame is movably connected by a hinge arrangement to the fixation frame.

In one or more embodiments, the hinge arrangement is arranged to engage with the frame profiles, e.g. sash frame profile and fixation frame profile, in hinge positions reinforced by the one or more metal reinforcement elements. The metal reinforcement element(s) may not be directly overlapping the hinge position(s) or be arranged to be directly connected to the hinge element(s) of the hinge arrangement, but may instead be located elsewhere in the frame profile so as to increase the overall strength of the frame profile in a sufficient manner to allow the hinge position to be stable enough for supporting the hinge arrangement.

In one or more embodiments, a first hinge element may be provided in a first hinge position as a slot/hole/cavity, e.g. a threaded slot/hole/cavity, in the profile shell of the frame profile of a fixation frame or the sash frame. Additionally and accordingly, a second hinge element, to be connected with the first hinge element, may be provided in a second hinge position as a protrusion/tongue/pin, e.g. a threaded protrusion/tongue/pin, located in the profile shell of the frame profile of a fixation frame or the sash frame. The hinge element(s) may be made during moulding of the profile shell, e.g. may be provided in polyurethane. Optionally, the hinge arrangement may comprise further hinge elements, e.g. pivotal hinge arrangements comprising interconnecting guide(s) and pin(s), which may be connected to the first and second hinge elements and optionally further fitted to the respective frame profile by fastening elements, e.g. adhesive or screws etc. The further hinge elements may preferably be made of metal.

In one or more embodiments, the hinge arrangement is arranged to engage with hinge position(s) in the frame profile, wherein one or more metal reinforcement element(s) extend in the frame profile and overlap the hinge position(s).

The metal reinforcement element(s), e.g. elongated metal reinforcement elements, may be arranged along the frame profile and arranged so as to overlap one or more, preferably all, hinge position(s), of the frame profile. The overlap may be understood as providing the metal reinforcement element along an inner surface of a profile shell section providing the hinge position(s), so that the metal reinforcement element is arranged opposite the hinge position(s), between the insulating core and the hinge position(s).

In one or more embodiments, the frame profile is configured to be comprised in a sash frame and/or in a fixation frame of the building aperture cover frame, e.g. as providing one or more frame structures of the frame, such as the side(s), the top and/or the bottom frame structure, e.g. sash structure and/or fixation frame structure.

In one or more embodiments, at least 95%, such as at least 97% or such as at least 99% of an inner cavity of the profile shell, enclosed by the inner shell surface, is filled, preferably by the insulating core or the insulating core and the metal reinforcement element(s).

In one or more embodiments, the insulating core and optionally the reinforcement element(s) may be arranged such that the interior transverse cross-sectional area enclosed by the profile shell is filled by the insulating core or the insulating core and the reinforcement element(s). Advantageously, by the frame profile, unfilled pockets in the frame profile are reduced and preferably eliminated by filling the entire profile shell, e.g. by using the RIM process. Unfilled pockets can have disadvantageous effects since they may support eddy currents and increased thermal conductivity. Preferably, the frame profile is devoid of any unfilled pockets, e.g. air cavities, being larger than 6 mm in size, such as 5 mm in size, such as larger than 4 mm in size, measured along the largest dimension of the pocket.

The second aspect of the present invention relates to a method of manufacturing a frame profile for a building aperture cover, wherein the frame profile is provided by the methods steps of:
a) providing an insulating core of insulating polyurethane (PUR) foam core material enclosed by a core surface of the insulating core,
b) placing one or more metal reinforcement element(s) on the core surface,
c) providing a profile shell of polyurethane encapsulating the insulating core, wherein the profile shell is provided by a reaction injection moulding process.

In one or more embodiments, the method comprises the step of providing the profile shell by reaction injection moulding the profile shell around the insulating core (and preferably also the metal reinforcement(s)). E.g. the insulating core (and preferably also the metal reinforcement(s)) may be placed in a reaction injection mould for making the profile shell and the reaction injection moulding of the profile shell may be undertaken in the mould providing a profile shell surrounding the insulating core and the metal reinforcement(s).

In one or more embodiments, the one or more metal reinforcement element(s) may instead or additionally be placed inside the insulating core, e.g. so that to opposing major surfaces of the metal reinforcement element are both facing the insulating core, e.g. an insulating core part.

In one or more embodiments, the method step of placing one or more metal reinforcement elements on the core surface is provided prior to the method step of providing the profile shell encapsulating the insulating core.

In one or more embodiments, the method step b) further provides as profile shell having a profile shell thickness below 3 mm, such as below 2 mm, such as below 1 mm or such as below 0.8 mm.

In one or more embodiments, the method step b) further provides as profile shell of non-uniform thicknesses between 0.3 and 8 mm, such as between 0.5 and 7 mm, such as between 0.7 and 6 mm.

In one or more embodiments, the reinforcement element(s) are fixed to the core surface by means of an adhesive, preferably a polyurethane (PUR) adhesive, prior to the method step of providing the profile shell around the insulating polyurethane foam core.

In one or more embodiments, the method provides a building aperture cover frame according to one or more embodiments of the first aspect.

A third aspect of the invention relates to a frame profile for framing an insulated glass (IG) unit in a building aperture cover frame, such as a window frame, wherein the frame profile comprises
  an insulating core of an insulating polyurethane (PUR) foam core material enclosed by a core surface of the insulating core, and
  a profile shell made of polyurethane (PUR) material, wherein the profile shell encapsulates the insulating core and comprises an inner shell surface facing the core surface.

In one or more embodiments, the frame profile comprises
  an insulating core of insulating polyurethane (PUR) foam core material enclosed by a core surface of the insulating core, wherein the insulating polyurethane (PUR) foam core material comprises at least 85% by weight polyurethane, and
    wherein the insulating polyurethane foam core material is of a material density ($\delta_{core}$) of less than 60 kg/m$^3$, such as less than 50 kg/m$^3$, preferably less than 40 kg/m$^3$,
  a profile shell encapsulating the insulating core and comprising an inner shell surface facing the core surface, wherein the profile shell is made of at least 90% by weight polyurethane, and
    wherein the profile shell is of a material density ($\delta_{shell}$) of at least 600 kg/m$^3$, such as at least 750 kg/m$^3$, preferably at least 850 kg/m$^3$,
  one or more metal reinforcement element(s) located between opposing parts of the inner shell surface and the core surface.

In one or more embodiments, the frame profile comprises one or more features, and associated benefits, according to one or more embodiments of the first and/or second aspect of the invention. E.g. any of the features associated with the insulating core, the profile shell and/or the reinforcement element(s) etc. of the frame profile of the first aspect and/or the second aspect of the present disclosure.

DRAWING

Figure 2:
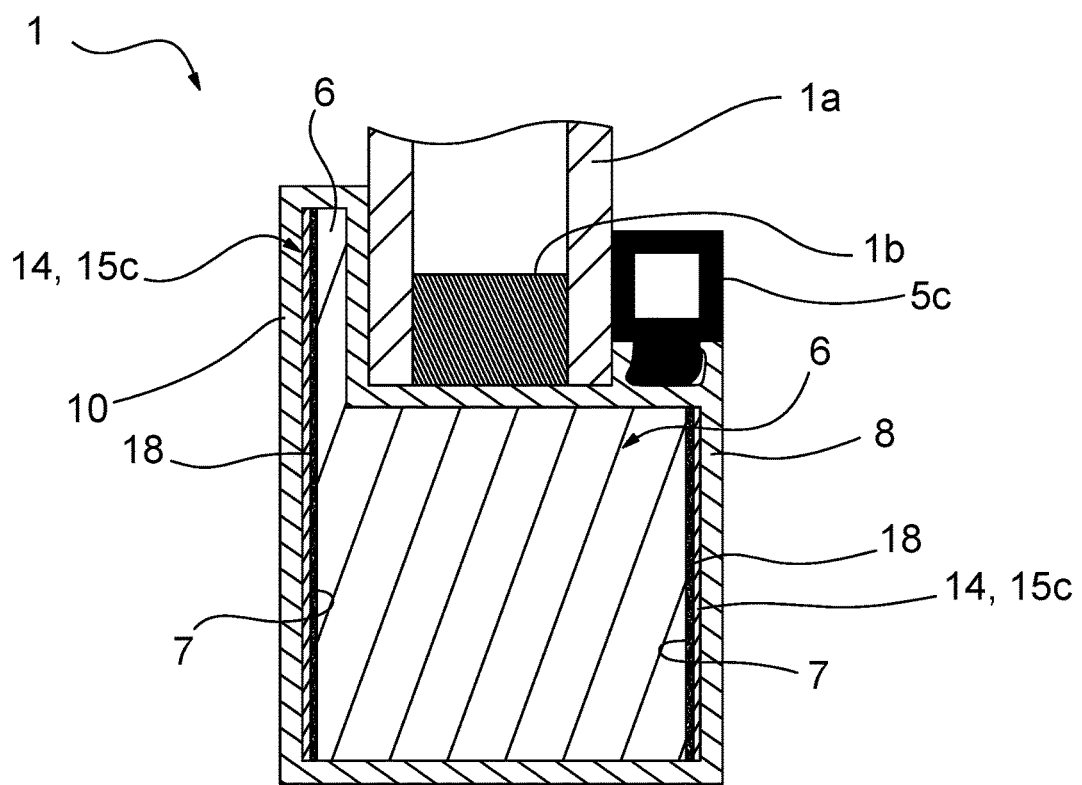
Figure 3:
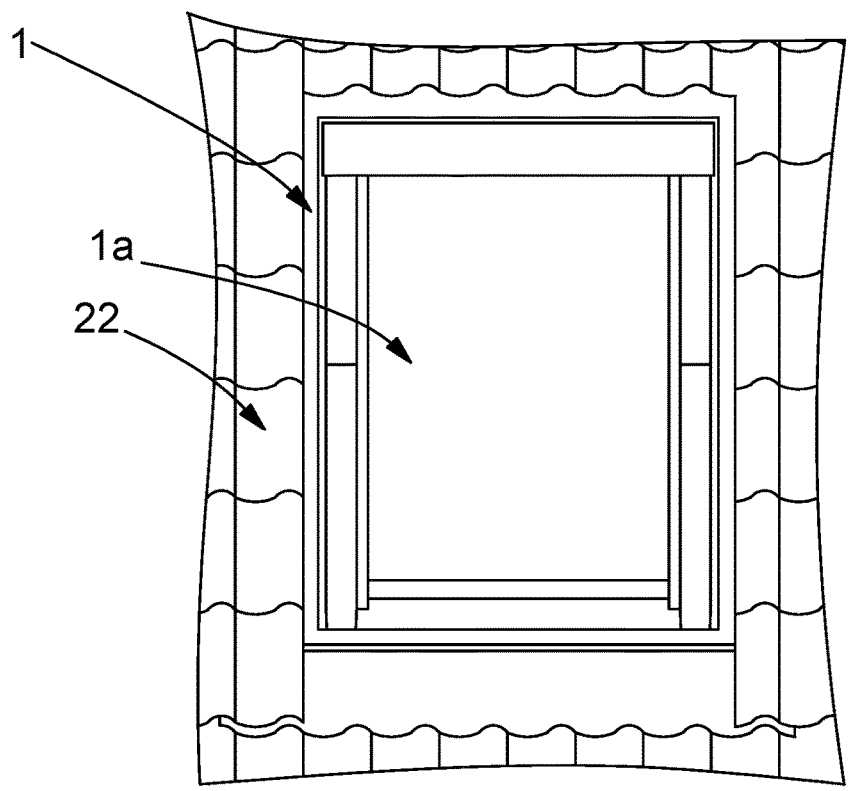
Figure 4:
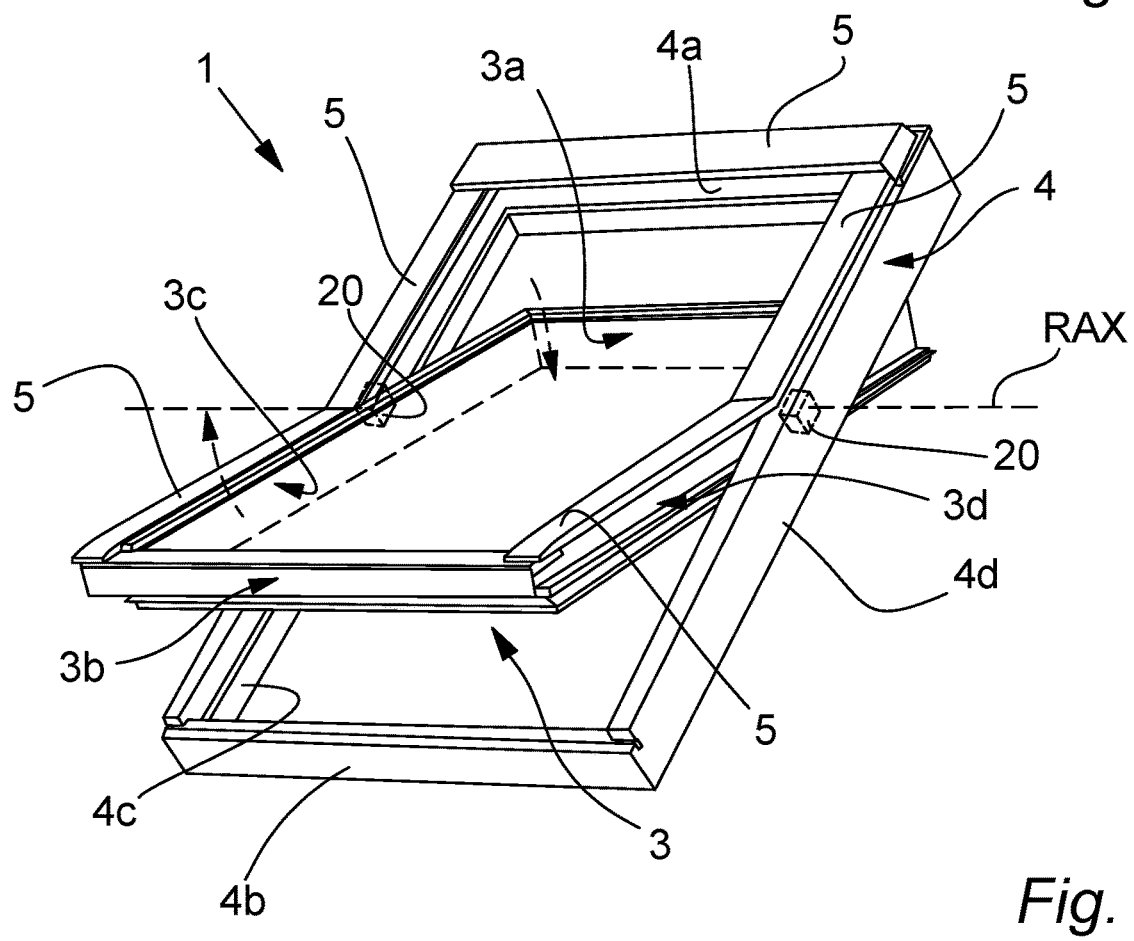
Figure 5:
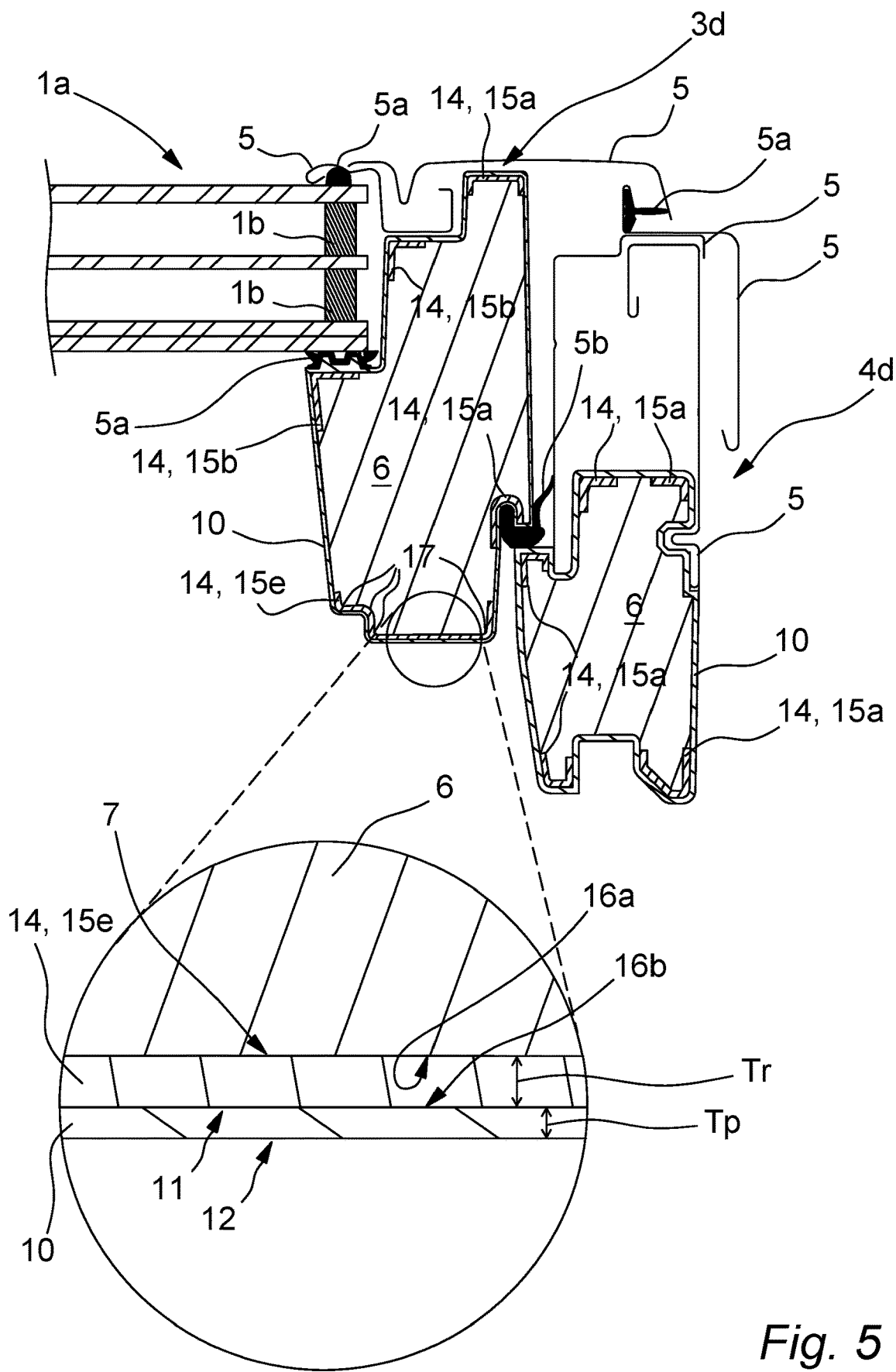
Figure 6:
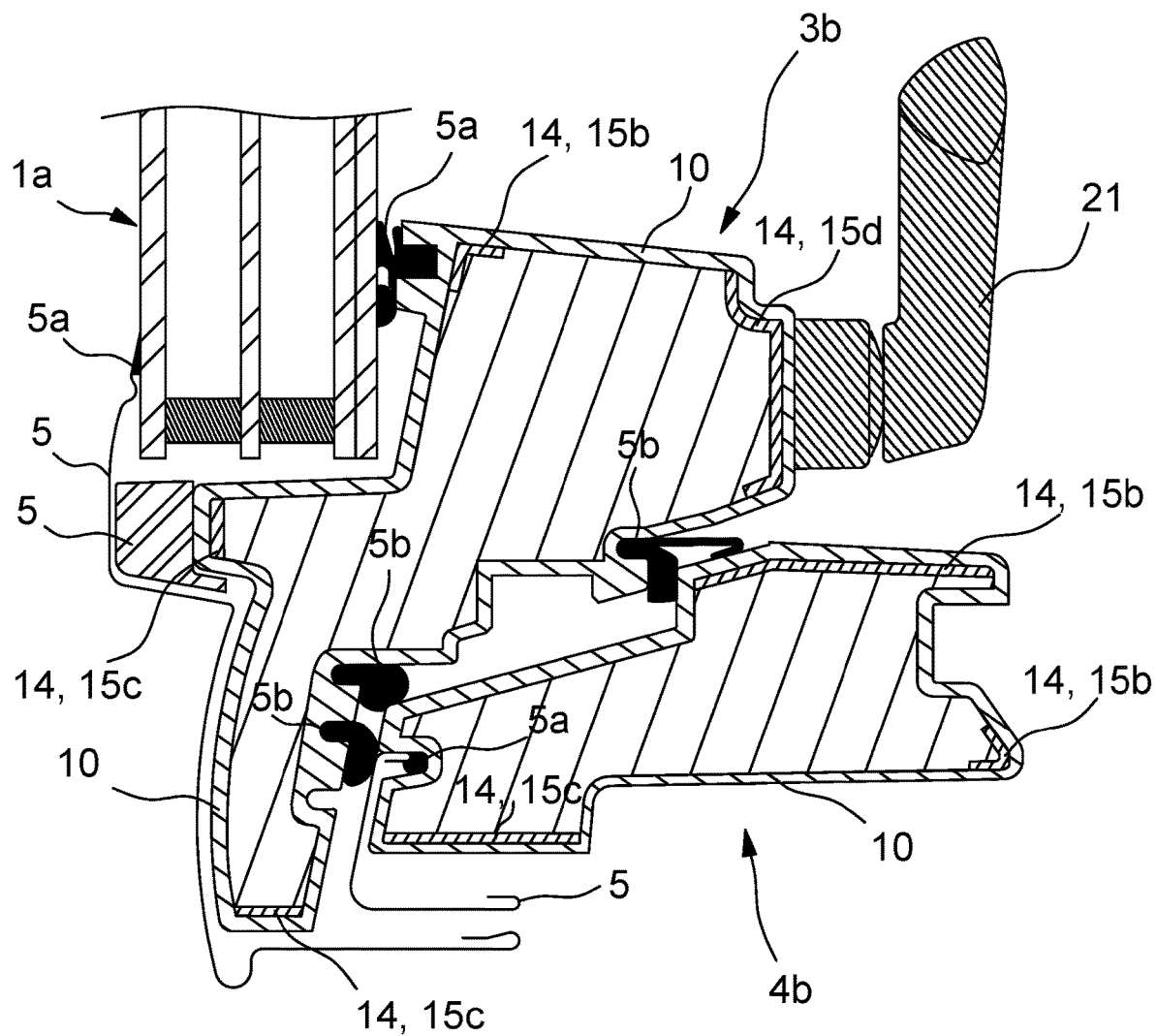
Figure 7:
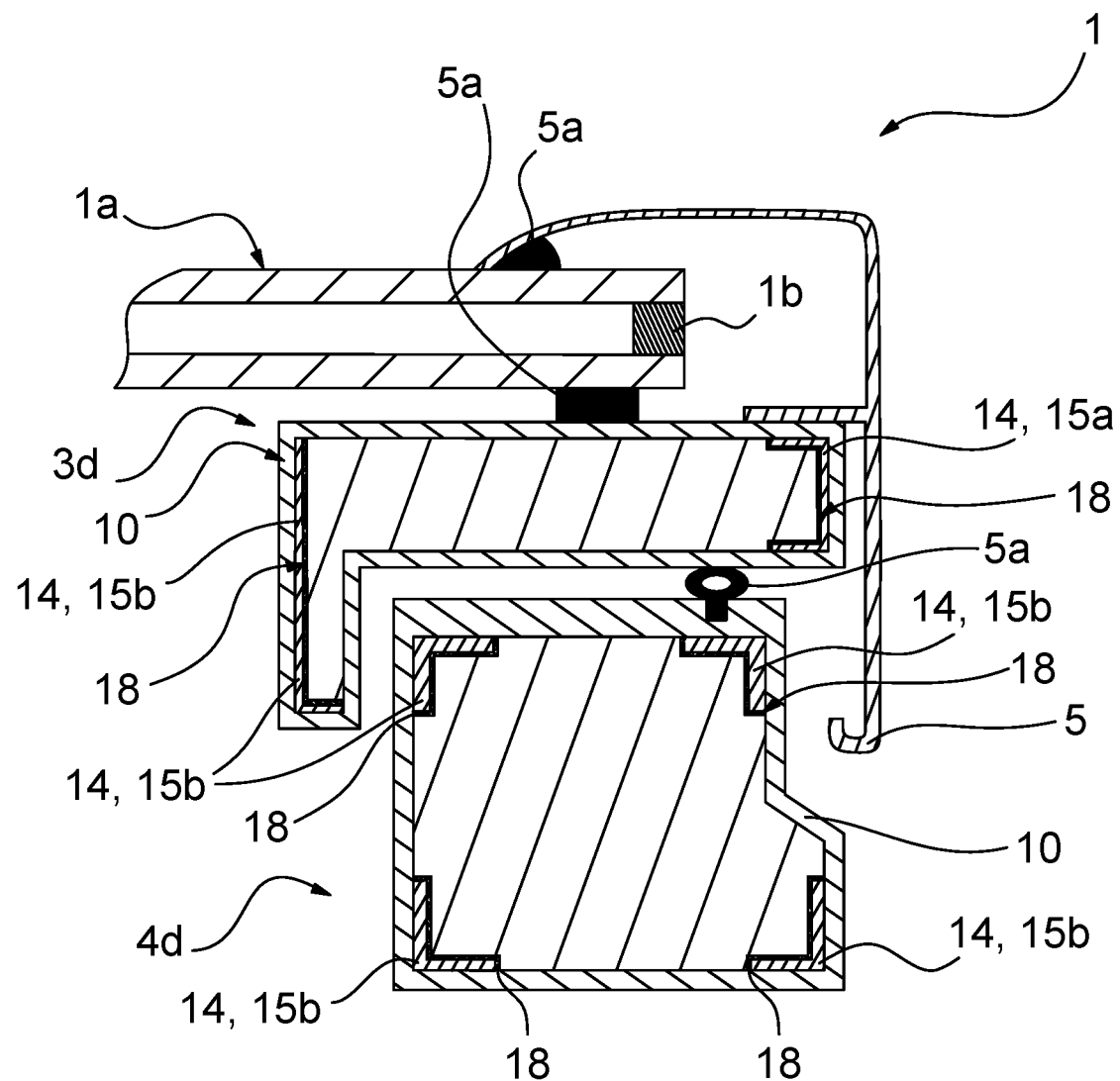
Figure 8:
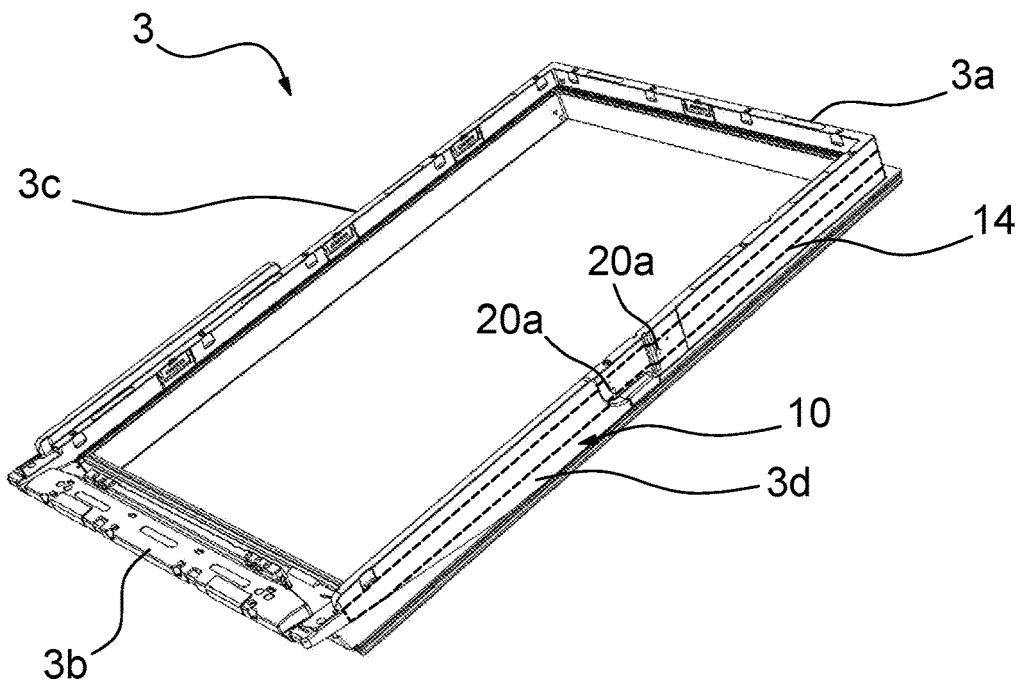
Figure 9:
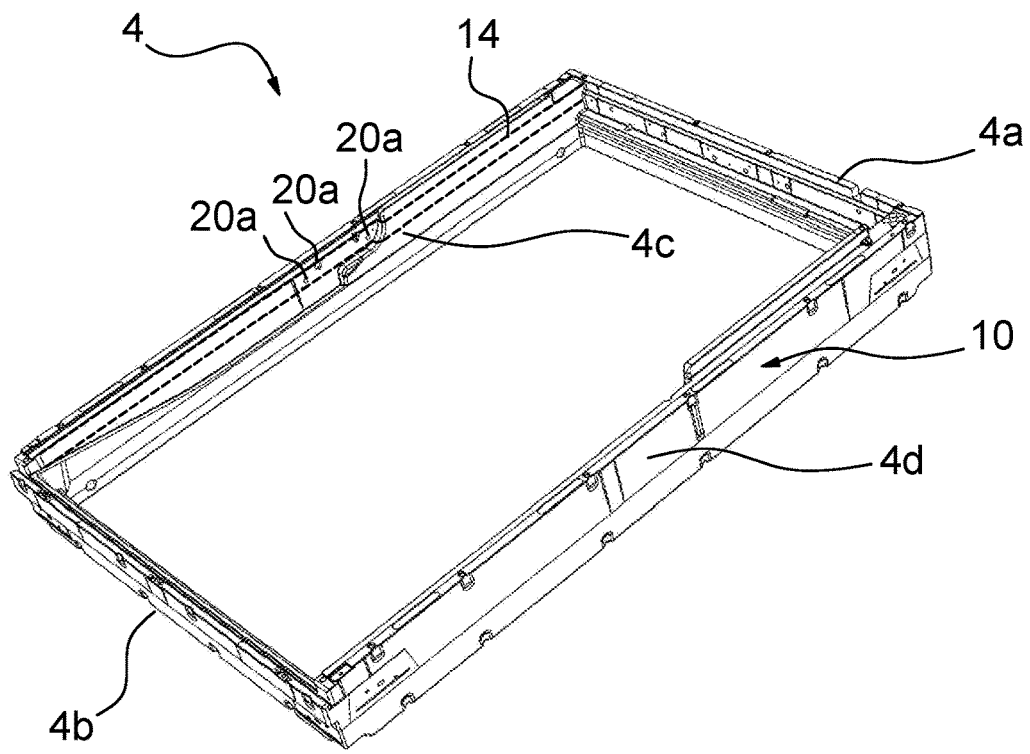
Figure 10:
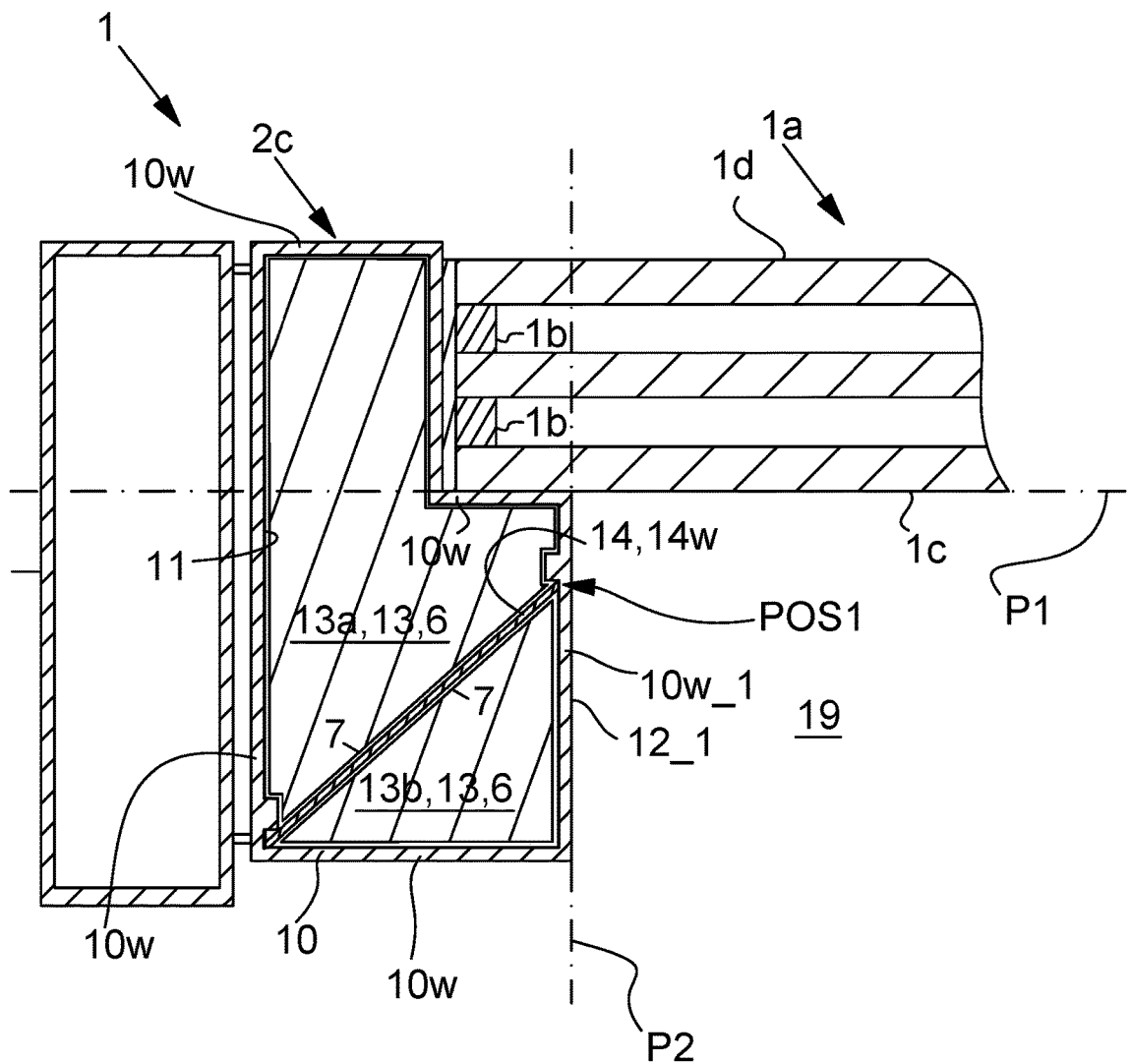

Aspects of the present disclosure will be described in the following with reference to the figures in which:

FIG. 1 shows front view of a building aperture cover frame according to embodiment(s) of the invention, FIG. 2 shows a transverse cross-sectional view of a frame profile of the building aperture cover of FIG. 1, FIG. 3 shows a front view of a roof with a building aperture cover frame according to embodiment(s) of the invention, FIG. 4 shows the building aperture cover frame of FIG. 3 as seen in perspective, FIG. 5 shows a transverse cross-sectional view of a frame profile of the building aperture cover frame according to FIGS. 3-4, FIG. 6 shows a transverse cross-sectional view of a frame profile of the building aperture cover frame according to FIGS. 3-4, FIG. 7 shows a transverse cross-sectional view of a frame profile of a building aperture cover frame according to embodiment(s) of the invention, FIG. 8 shows a sash frame comprising frame profiles according to embodiment(s) of the invention, seen in perspective, FIG. 9 shows a fixation frame configured to be fitted with the sash frame of FIG. 8 and comprising frame profiles according to embodiment(s) of the invention, and FIG. 10 illustrates a frame profile according to embodiments of the present disclosure, comprising a metal reinforcement arranged in an inner cavity of the frame profile.

DETAILED DESCRIPTION OF THE INVENTION

FIG. 1 shows a schematic front view of a building aperture cover frame 1 framing an insulating glass unit 1a and comprising four frame profiles 2 according to the invention; a top frame profile 2a, a bottom frame profile 2b, a first side frame profile 2c and a second side frame profile 2d which are attached to form the frame 1. Alternatively, the cover frame 1 may comprise 1, 2, 3 or more than four frame profiles according to the invention, e.g. the side frame profiles 2c, 2d may be according to the invention while the top and bottom frame profiles 2a, 2b are not, or vice versa. Moreover, providing a cover frame having only one frame profile according to the invention is also possible, e.g. the cover frame may comprise a side, top or bottom frame profile. Alternatively, the building aperture cover frame 1 of FIG. 1, or any other embodiments, may comprise a single one-piece, and generally seamless, frame profile 2 providing all sides (top 2a, bottom 2b, first side 2c and second side 2d) of the frame 1.

The building aperture cover frame 1a of FIG. 1 is a window 1 to be installed in an aperture of a building. The window 1 may e.g. be a window for vertical installation in an aperture of an outer wall of a building, or a roof window for installation in a roof construction, e.g. substantially horizontally, or with an angle between the glass unit 1a of the window 1 and horizontal (in a closed configuration of the window) being between 15° and 80°, such as between 17° and 65°.

FIG. 2 shows a schematic transverse cross-sectional view of the bottom frame profile 2b of the building aperture cover frame 1 of FIG. 1. A transverse cross-section is generally provided in a plane perpendicular to the longitudinal extent of the frame profile, e.g. in FIG. 1 the longitudinal extent of a side frame profile Ls and the longitudinal extent of the bottom frame profile Lb are indicated.

The frame profile 2 may in embodiments of the present disclosure optionally comprise one or more metal reinforcement elements 14, e.g. as seen in FIG. 2, wherein the metal reinforcement elements are configured to contribute to the structural integrity of the frame 1 and hence help to provide a more stiff cover frame 1.

The metal reinforcement element 14 may comprise iron reinforcement, steel reinforcement or aluminium reinforcement element. In some embodiments of the present disclosure, the reinforcement element(s) 14 comprises a ferromagnetic metal reinforcement. Hereby, a magnet may be used for separating the reinforcement element 14 from the remaining material, when the window is subsequently scrapped at the end of life.

In one or more embodiments, the metal reinforcement element 14 may be provided by elongated metal reinforcement elements, which extend along the longitudinal extent of the frame profile 2 for added stiffness and less flexibility. The metal reinforcement elements 14 may extent along at least 50%, such as at least 80% or such as at least 90% of the longitudinal extent of the frame profile 2. The metal reinforcement elements 14 may be of any transverse cross-sectional shape, such as rectangular, square, circular, oval etc. However, preferably the metal reinforcement element 14 of the present disclosure are made of metal plates much larger width and length than thickness thereof.

The bottom frame profile 2b of FIG. 2 is shown comprising an outer shell profile 10 made of polyurethane, which has been reaction injection moulded onto a polyurethane insulating core 6 having metal reinforcement elements 14, 15c adhered, e.g. by using a polyurethane adhesive 18, onto a core surface 7 of the insulating core 6. In the present example, the metal reinforcement elements 14, 15c are provided by plate-shaped metal plates 14, 15c, arranged on opposing core surfaces 7 of the insulating core 6. The plate-shaped metal plates 14, 15c are preferably extending in the longitudinal extent of the frame profile 2b (not shown). In FIG. 2, the metal plates are of a width allowing them to extend substantially along the entire opposing core surfaces 7, so as to sandwich the insulating core 6 and the adhesive 18 between the metal plates 14, 15c. By separating the metal plates 15c by the insulating core 6, the metal plates 15c do not create a thermal bridge is between the inside and outside surfaces of the window 1, when installed.

The top frame profile 2a and/or the first side profile 2c and/or the second side profile 2d may also comprise the elements as described in relation to FIG. 2, e.g. a polyurethane insulating core 6, metal reinforcement element(s) 14 and a polyurethane profile shell 10. Alternatively, the top frame profile 2a and/or the first side profile 2c and/or the second side profile may be of a different frame profile type, e.g. comprising a wood or air as the insulating core.

An insulating glass unit 1b is installed in the bottom frame profile 2b, in a recess provided in the profile shell 10. A holding element 5c is further fitted in the profile shell 10 up against the insulated glass unit 1b so as to aid in keeping the glass unit 1a in place. The holding element 5c may be a mechanical element such as a profile connected to the profile shell 10 by snap-connection.

In one or more embodiments of the present disclosure, the insulated glass unit may be filled with gas, e.g. argon, or be evacuated, e.g. a vacuum insulated glass unit. The filled void of the insulated glass unit 1b may be enclosed by a peripheral seal 1b.

FIG. 3 shows a schematic drawing of a building aperture cover frame 1 installed in a roof 22 of a building structure, e.g. a house. The building aperture cover frame 1 has an insulated glass unit fitted 1a therein. FIG. 4 shows a schematic drawing of the building aperture cover frame 1 of FIG. 3 without the insulated glass unit 1a of FIG. 3. The building aperture cover frame 1 comprises a sash frame 3 and a fixation frame 4, the sash frame 3 being rotatably fitted to the fixation frame 4 by a hinge arrangement 20, so that the sash frame 3 can move relative to the fixation frame 4 about an axis of rotation RAX as shown in FIG. 4. The sash frame 3 can thereby be opened and closed. Alternatively, the sash frame 3 may be rotatably fixed to the top fixation frame profile to provide a top hung window.

The sash frame 3 comprises a top sash frame profile 3a, a bottom sash frame profile 3b, a first side sash frame profile 3c and a second side sash frame profile 3d being frame profiles according to one or more embodiments of the present disclosure.

The fixation frame 4 comprises a top fixation frame profile 4a, a bottom fixation frame profile 4b, a first side fixation frame profile 4c and a second side fixation frame profile 4d being frame profiles according to one or more embodiments of the present disclosure. Alternatively, one or more of the sash frame profiles and/or the fixation frame profiles may be of a different, e.g. traditional, type of frame profile.

In the present examples, shown in FIGS. 3-7, the building aperture cover frame 1 further comprises cover elements 5, e.g. for weather protection, shielding or decorative purposes etc., which are attached on the frame profiles 2. The cover elements may be combined with attachment means and/or sealing means 5a, as shown in FIGS. 5-7. In one or more examples, compressible gaskets 5b may further be provided e.g. between the sash frame 3 and the fixation frame 4 as shown in FIGS. 5-7.

FIG. 5 shows a schematic drawing of a transverse cross-section of the second side sash frame profile 3d and the second side fixation frame profile 4d of FIGS. 4 and 3, with the insulated glass unit 1a installed in the second side sash frame profile 3d. Both the sash frame profile 3d and the fixation frame profile 4d are according to embodiment(s) of the present disclosure, each having a polyurethane insulating foam core 6 and a polyurethane shell profile 10 surrounding the core 6 with metal reinforcement elements 14 sandwiched between the insulating foam core 6 and the profile shell 10. As seen in the close-up provided in FIG. 5, the insulating core 6, the metal reinforcement elements 14 and the profile shell 10 are in a layered arrangement, such that a second reinforcement surface 16b of the metal reinforcement 14, in the present example, a metal plate 15e, is facing an inner shell surface 11 of the shell profile 10, e.g. in parallel with the inner shell surface, with no polyurethane foam core material 6 arranged therein between. Additionally, a first reinforcement surface 16a of the metal plate 15e is facing the core surface 7 of the insulating core (and the cavity created by the hollow profile shell 10). By arranging the metal plate 15e along the surface and avoiding fully embedding any part thereof in the insulating core 6, the metal plate 15e may be more readily removed e.g. for replacement or recycling.

In one or more examples, the profile shell thickness Tp may be in the range of 0.5 to 8 mm, such as between 0.7 and 6 mm, or such as between 0.8 and 4 mm. The metal reinforcement element may be of a reinforcement thickness between 0.8 mm and 8 mm, such as between 0.9 mm and 3 mm, or such as between 1-2 mm. The shell thickness is generally measured along a line perpendicular to the outer shell surface 12 and the inner shell surface 11, while the reinforcement thickness Tr is generally measured along the same line. A visual example of how the thicknesses are determined are shown in FIG. 5, where the reinforcement thickness is measured from the first reinforcement surface 16a to the second reinforcement surface 16b of the metal plate 15e and the shell thickness Tp is measured from the outer shell surface 12 to the inner shell surface 11.

The profile shell 10 additionally comprises an outermost exterior shell surface 12 directed towards an outside environment, which may be partly or fully covered by decorative or functional shielding elements.

Both the sash frame profile 3d and the fixation frame profile 4d of FIG. 5 comprises different shapes of metal reinforcement elements 14. The metal reinforcement elements 14 of the second side sash frame profile 3d include two U-shaped metal plates 14, 15a at the uppermost part of the second side sash frame profile 3d and near the lowermost part, towards the inner side of second side sash frame profile 3d directed towards the fixation frame profile 4d, two L-shaped metal plates 14, 15b at the insulated glass unit 1a and a multi-bend metal plate 14, 15e comprising multiple bends 17 covering the lowermost side of the second side sash frame profile 3d.

The metal reinforcement elements 14 of the second side fixation frame profile 4d include three U-shaped metal plates 14, 15a at the lowermost side of the second side fixation frame profile 4d and below the insulated glass unit 1a, and two L-shaped metal plates 14, 15b at the uppermost side of the second side fixation frame profile 4d.

FIG. 6 shows a schematic drawing of a transverse cross-section of the bottom sash frame profile 3b, and the bottom fixation frame profile 4b of FIGS. 4 and 3, with the insulated glass unit 1a installed in the bottom sash frame profile 3b as with the second side sash frame profile 3d and the second side fixation frame profile 4d, the bottom sash frame profile 3b and the bottom fixation frame profile 4b are frame profiles according to embodiment(s) of the present disclosure, with a polyurethane insulating foam core 6, metal reinforcement elements 14 and a shell profile 10. The bottom sash frame profile 3b is further fitted with a handle assembly arranged with appropriate locking means (not shown) to be able to lock and unlock the sash frame 3 relative to the fixation frame 4 (see the full sash frame 3 and fixation frame 4 in FIG. 4). The bottom sash frame profile 3b is arranged to come into engagement with the fixation frame 4 via gaskets 5b provided between the frame profiles 3b, 4b.

Both the bottom sash frame profile 3b and the bottom fixation frame profile 4b of FIG. 6 comprises different shapes of metal reinforcement elements 14. The metal reinforcements 14 of the bottom side sash frame profile 3b include a S-shaped metal reinforcement 14, 15d at the uppermost part of the bottom sash frame profile 3b towards the inner side of bottom side sash frame profile 3b directed towards the fixation frame profile 4b, one L-shaped metal plate 14, 15b at the insulated glass unit 1a and two plate-shaped metal plates 14, 15c at the lowermost side of the bottom side sash frame profile 3b and below the insulated glass unit 1a.

The metal reinforcement elements 14 of the bottom side fixation frame profile 4b include a plate-shaped metal plates 14, 15c at the lowermost side, two L-shaped metal plates 14, 15b at the uppermost side and at the inner side of the bottom side fixation frame profile 4b. The inner side to be arranged towards the wall of the building.

FIG. 7 shows a schematic drawing of a transverse cross-section of a different design of a second side sash frame profile 3d and a second side fixation frame profile 4b of a building aperture cover, e.g. window, to be installed in a roof, such as in a flat roof. The remaining frame profiles of the building aperture cover frame (not shown) may be of similar design, e.g. according to one or more embodiments of the present disclosure. The second side sash frame 3d is arranged to be movable relative to the second side fixation frame 4b, which is instead arranged to be fixed to a building structure. A seal between the second side sash frame 3d and the second side fixation frame 4b may be provided by a gasket 5a, when the building aperture cover is closed. Both frame profiles 3d, 4d are seen comprising a polyurethane profile shell 10 enclosing an insulating core 6 on which metal reinforcement elements 14 are attached by a polyurethane adhesive 18.

Both the second side sash frame profile 3d and the second side fixation frame profile 4d of FIG. 7 comprises different shapes of metal reinforcement elements 14. The metal reinforcement elements 14 of the second side sash frame profile 3d include an L-shaped metal reinforcement element 14, 15b at the outer side of the sash frame profile 3d and a U-shaped reinforcement element 14, 15a at the inner side of the sash frame profile 3d, the inner side to be arranged wall of the building. The metal reinforcement elements 14 of the second side fixation frame profile 4d include four L-shaped metal plates 14, 15b at each corner of the second side fixation frame profile 4d.

FIG. 8 shows an embodiment of a sash frame 3, seen in perspective while FIG. 9 shows an embodiment of a fixation frame 4, seen in perspective. The sash frame 3 and the fixation frame 4 are arranged to be movably connected and fitted in a resulting window frame. The sash frame 3 comprises a bottom sash frame profile 3b connected to a top sash frame profile 3a of the sash frame 3 via a first side sash frame profile 3c and a second side sash frame profile 3d so as to create a frame structure for framing a window pane, e.g. an insulated glass unit. The fixation frame 4 comprises a bottom fixation frame profile 4b connected to a top fixation frame profile 4a of the fixation frame profile 4 via a first side fixation frame profile 4c and a second side fixation frame profile 4d so as to create a frame structure for accommodating the movement of the sash frame 3.

The present sash frame 3 and/or the fixation frame 4 may each be made as a single one-piece frame profile by providing a frame-shaped insulating core and over-moulding the insulating core with polyurethane material so as to create a frame-shaped profile shell 10. As seen in FIGS. 8 and 9, the sash frame 3 and the fixation frame 4 are each of different transverse cross-sectional shape/size in different parts of the sash frame 3/fixation frame 4, which may be readily changed by modifying the mould. The resulting shape of the sash frame 3 and the fixation frame 4 are preferably designed based on how the frames 3, 4 are to be implemented in the resulting window. E.g. in order to be installed in a fixation frame 4, the sash frame 3 may in a discrete locations on the frame 3 be shaped to accommodate a hinge arrangement (not shown) onto the sash frame 3, e.g. by providing one or more holes at hinge positions 20a as shown in FIG. 8. The same applies for the fixation frame 4, which also comprises one or more holes at hinge positions 20a as shown in FIG. 9.

Additionally, metal reinforcement elements 14, preferably elongated metal reinforcement elements 14, may be provided under the profile shell 10 in a position so as to overlap the hinge positions 20a from underneath and extend along the profile shell 10. The hinge positions 20a and associated metal reinforcement elements 14 are shown in the second side sash frame profile 3d in FIG. 8 and in the first side fixation frame profile 4c in FIG. 9, but may preferably be provided in both the first side frame profile 3c, 4c and the second side frame profile 3d, 4d (not shown). In the present embodiments of FIGS. 8-9, the metal reinforcement elements 14 extend along the majority of the longitudinal extent of the profile shell 10 thereby increasing the rigidity of the frame profile 3, 4 and decrease its ability to flex, bend or bulge. Alternatively, the metal reinforcement elements 14 may merely be provided with the purpose of increasing strength at a discrete position in the frame profile 3, 4 e.g. at the hinge positions 20a to mainly serve to provide rigidity to the frame profile 3, 4 at hinge positions 20a.

In one or more embodiments, the hinge positions 20a may allow for direct connections between the hinge arrangement (not shown) to be fitted to the frames 3, 4 and the metal reinforcement elements 14. Alternatively or additionally, indirect connection may be provided, e.g. via the insulating core and/or the profile shell 10, e.g. by providing increased rigidity and strength at areas of the frame profiles 3,4, e.g. the profile shell 10, comprising the hinge positions 20a.

FIG. 10 shows an embodiment a cross sectional view through a part of a side frame profile 2c of a building aperture cover 1 according to the present disclosure, e.g. such as shown in FIG. 1, where the side frame profile 2c is shown in a transverse plane that is perpendicular to the longitudinal direction of the profile 2c. A glass unit 1a is supported by the frame 1. The glass unit 1a comprises a first outer major surface 1c for facing the interior of a building, and a second outer major surface 1d for facing away from the interior of a building when the roof window is installed in an aperture of a building, such as an aperture of a building roof structure. Generally, in one or more embodiments of the present disclosure, the glass unit 1a may be an insulated glass unit with multiple glass sheets separated by inert gas or vacuum in a gap/cavity between the glass sheets.

As can be seen, the profile 2c is hollow and comprises an inner profile shell cavity 13 enclosed by profile shell walls 10w, made of polyurethane, e.g. made of at least 90% polyurethane by weight. The walls 10w are the outermost walls of the profile 10, and encloses a cavity 13 by inner shell surfaces 11. These inner surfaces 11 are in FIG. 2 marked with a more bold line for improved understanding and identification of the inner cavity.

The metal reinforcement element 14 comprises a wall part 14w extending in a direction away from a first region/area POS1 located proximate a first plane P1. The first plane P1 comprises/is defined by the first outer major surface 1c of the glass unit 1a. Moreover, the metal reinforcement element 14 extends in the inner cavity 13 in a direction away from a second plane P2. The second plane P2 is perpendicular to the first plane P1. Additionally, the second plane P2 extends parallel to the longitudinal direction Ls of the frame profile 2a, and touches a part of an outer surface 12_1 of a first profile shell wall 10w_1 of the frame profile that faces and is proximate the frame opening 19.

Hereby, the inner cavity 13 is split into a first cavity part 13a located at a first side of the reinforcement profile 14 wall 14w, and a second cavity part 13b located at a second, opposite side of the reinforcement element 14 wall 14w.

The reinforcement element 14 in FIG. 2 comprises a plate shaped reinforcement element comprising a first major surface facing towards the first cavity part 13a, and a second major surface facing towards the second cavity part 13b. The frame profile is seen comprising an insulating core part 6a, 6b on each side of the reinforcement 14, wherein one or both insulating core parts 6a, 6b may be made of polyurethane foam material. Each insulating core part 6a, 6b may comprise a core surface 7 defining the outer boundary of the core part 6a, 6b, and the reinforcement may be arranged along at least a part of said core surfaces 7 of both core parts 6a, 6b, such between opposing parts of said core surfaces 7, as shown in FIG. 2. The metal reinforcement element 14 may be in abutment with the core surfaces 7, such as adhered to the core surfaces by an adhesive according to embodiment(s) of the present disclosure.

In one or more embodiments, further metal reinforcement elements (not shown) may be added to the embodiments of FIG. 10, such as metal reinforcements provided along the interior profile shell surface, as shown in FIGS. 2, 5, 6 and 7. Metal reinforcement elements as the one shown in FIG. 10 may be added to the embodiments of FIGS. 2, 5, 6 and 7 (not shown). In one or more embodiments, the examples shown in FIG. 10 may additionally or alternatively comprise a different shaped reinforcement, such as L-shaped, U-shaped, S-shaped or a different shape. In one or more embodiments, other arrangements, locations and/or orientations of the metal reinforcement element than those depicted in the above examples, may additionally or alternatively be applied, without departing from the invention of the present disclosure.

In the embodiments shown in FIGS. 1-10, each frame profile 2, 2a, 2b, 2c, 2d, 3a, 3b, 3c, 3d, 4a, 4b, 4c, 4d comprises a single cavity provided by the profile shell 10, which is filled by the insulating core and the reinforcement elements. However, in alternative embodiments (not shown), the single cavity may be replaced with a multi-cavity having a plurality, such as 2, 3, or more, separated cavities. The cavities may be separated so as to form a plurality of longitudinal cavities extending in the longitudinal extent of the frame profile 2, 2a, 2b, 2c, 2d, 3a, 3b, 3c, 3d, 4a, 4b, 4c, 4d and/or separated so as to form a plurality of transverse cavities arranged end to end along the longitudinal extent of the frame profile 2, 2a, 2b, 2c, 2d, 3a, 3b, 3c, 3d, 4a, 4b, 4c, 4d. Advantageously, the different cavities may be filled with polyurethane core material of different properties allowing for larger flexibility in the resulting insulating capability. The plurality of cavities may preferably separated by the profile shell, e.g. by interior profile shell walls.

In one or more embodiments of the present disclosure, such as any of the embodiments shown in FIGS. 1-10, the thermal conductivity coefficient/lambda value λ of e.g. the insulating polyurethane foam material 6, may be a declared and/or rated value that may e.g. be determined according to proper standards and/or methods for defining/determining thermal conductivity of the insulation material 6, 10 of the frame profile 2, 2a, 2b, 2c, 2d, 3a, 3b, 3c, 3d, 4a, 4b, 4c, 4d. E.g., in one or more aspects of the present disclosure, the insulation material may be determined to have a declared thermal conductivity that may e.g. be determined according to a suitable standard, such as DS EN 12667:2001 and/or ASTM C518 and/or according to a proper/suitable technical assessment such as an ETA (European Technical Assessment) that is suitable for defining the thermal conductivity coefficient of the insulation material 6. Thermal conductivity varies depending on density of the insulating material.

A way of determining the density of the insulation core material 6 may be provided by cutting or by other means opening the profile shell 10, and remove and weigh the insulation core material 6, and moreover determine the volume of the insulation core material 6. The conditions when determining the density may be at 23° C. and a relative humidity of about 50%. In that case, the profile comprising the insulation material should have been kept under these conditions for long enough to adapt/settle to the temperature and air humidity, e.g. for several days such as at least two days. The density of the insulating polyurethane foam materials may be determined/defined by weight [kg] per cubic meter [$m^3$]. In one or more embodiments, such as the embodiments described in FIGS. 1-10, the polyurethane foam material of the insulating core 6 may have a density of less than 60 kg/$m^3$, such as less than 50 kg/$m^3$, or such as less than 40 kg/$m^3$. Additionally or alternatively, the profile shell 6 may have a density of at least 600 kg/$m^3$, such as at least 800 kg/$m^3$, such as about 900 kg/$m^3$.

In one or more embodiments of the present disclosure, such as the embodiments described in FIGS. 1-10, the insulating core may consist of at least 85% polyurethane material, such as polyurethane material cut from a slab or board of polyurethane material e.g. of a material density below 60 kg/$m^3$. Preferably at least 85% of the insulating core is of polyurethane material. Additionally or alternatively, the profile shell 6 may consist of at least 90%, such as at least 98% polyurethane material, e.g. of a density between 800-1000 kg/$m^3$.

In one or more embodiments of the present disclosure, such as the embodiments described in FIGS. 1-10, wherein at least 95% of the interior cavity of the shell profile 10, enclosed by the inner shell surface 11, is filled by the insulating core and the reinforcement element(s), at least when viewed in a transverse cross-sections along the majority of the frame profile 2, 2a, 2b, 2c, 2d, 3a, 3b, 3c, 3d, 4a, 4b, 4c, 4d.

In one or more embodiments of the present disclosure, e.g. any of the embodiments shown in FIGS. 1-10, the insulating core may be devoid of any of the following insulating materials: Expanded polystyrene (EPS), extruded polystyrene (XPS), expanded nitrile rubber (ENR), polyurethane (PUR), polyethylene (PE) and/or ethylene vinyl acetate (EVA). Preferably, the insulating core only consist of polyurethane foam material.

In one or more embodiments of the present disclosure, e.g. any of the embodiments shown in FIGS. 1-10, the shell profile 10 may be devoid of any plastic material being different than Polyurethane material, such as polypropylene, PVC, polystyrene, CPVC, PP polypropylene, PA6 Polyamide, or PET polyethylene terephthalate.

In one or more embodiments of the present disclosure, e.g. any of the embodiments of FIG. 1-10, the profile shell 10 was formed by a reaction injection moulding (RIM) process by mixing two thermoset materials, isocyanate and polyol, which flow into a mould for making the profile shell. The frame profile 2, 2a, 2b, 2c, 2d, 3a, 3b, 3c, 3d, 4a, 4b, 4c, 4d may be manufactured by first forming the insulating core either on-site, by a foaming process, or by carving out an insulating core from a pre-made block of insulating material. The insulating core is then placed inside the mould and the mixture introduced in the mould expand and polymerize forming the profile shell enclosing the insulating core. If metal reinforcement element(s) have to be incorporated in the frame profile 2, 2a, 2b, 2c, 2d, 3a, 3b, 3c, 3d, 4a, 4b, 4c, 4d, these may either be placed inside the mould or on the insulating core, e.g. by using adhesive, prior to the formation of the profile shell.

The present disclosure further relates to the following items:

ITEMS

1. A building aperture cover frame (1), such as a window frame, comprising at least one frame profile (2, 2a, 2b, 2c, 2d, 3a, 3b, 3c, 3d, 4a, 4b, 4c, 4d) for framing an insulated glass (IG) unit (1a), wherein the frame profile (2, 2a, 2b, 2c, 2d, 3a, 3b, 3c, 3d, 4a, 4b, 4c, 4d) comprises
   an insulating core (6) of an insulating polyurethane (PUR) foam core material enclosed by a core surface (7) of the insulating core, and
   a profile shell (10) made of polyurethane (PUR) material, wherein the profile shell (10) encapsulates the insulating core (6) and comprises an inner shell surface (11) facing the core surface (7).
2. The building aperture cover frame (1) according to item 1, wherein the polyurethane foam core material is made of at least 85% by weight polyurethane, such as at least 90% by weight polyurethane, or such as at least 95% by weight polyurethane.
3. The building aperture cover frame (1) according to any of the items 1-2, wherein the insulating polyurethane foam core material is of a material density ($\delta_{core}$) of less than 60 kg/m$^3$, such as less than 50 kg/m$^3$, preferably less than 40 kg/m$^3$.
4. The building aperture cover frame (1) according to any of the preceding items, wherein the profile shell (10) is made of polyurethane made of at least 90% by weight polyurethane, such as at least 95% by weight polyurethane, or such as at least 98% by weight polyurethane.
5. The building aperture cover frame (1) according to any of the preceding items, wherein the profile shell (10) is of a material density ($\delta_{shell}$) of at least 600 kg/m$^3$, such as at least 750 kg/m$^3$, preferably at least 850 kg/m$^3$.
6. The building aperture cover frame (1) according to any of the preceding items, wherein the profile shell (10) is of a material density ($\delta_{shell}$) of between 600-1200 kg/m$^3$, such as between 750-1050 kg/m$^3$, preferably between 850 and 950 kg/m$^3$.
7. The building aperture cover frame (1) according to any of the preceding items, wherein the insulating polyurethane foam core material is of a material density ($\delta_{core}$) between 20-60 kg/m$^3$, such as between than 30-50 kg/m$^3$, preferably between 35-45 kg/m$^3$.
8. The building aperture cover frame (1) according to any of the preceding items, wherein the difference in polyurethane content in the profile shell (10) compared to the polyurethane content in the insulating core (6) differs by less than 10% such as less than 5%, or such as less than 2% by weight.
9. The building aperture cover frame (1) according to any of the preceding items, wherein the frame profile (2, 2a, 2b, 2c, 2d, 3a, 3b, 3c, 3d, 4a, 4b, 4c, 4d) further comprises one or more metal reinforcement elements (14, 15, 15a, 15b, 15c, 15d, 15e), such as one or more steel reinforcement elements, wherein the metal reinforcement element(s) (14, 15, 15a, 15b, 15c, 15d, 15e) are located between opposing parts of the inner shell surface (11) and the core surface (7).
10. The building aperture cover frame (1) according to item 9, wherein the metal reinforcement(s) (14, 15, 15a, 15b, 15c, 15d, 15e) are located at an interface between the profile shell (10) and the insulating core (6), such as located on the core surface (7) and/or on the inner shell surface (11).
11. The building aperture cover frame (1) according to any of the items 9-10, wherein the metal reinforcement element(s) (14, 15, 15a, 15b, 15c, 15d, 15e) are arranged such that the metal reinforcement elements (14, 15, 15a, 15b, 15c, 15d, 15e) are not exposed to the outside environment, when installed in the building aperture cover frame (1).
12. The building aperture cover frame (1) according to any of the items 9-11, wherein the metal reinforcement elements (14, 15, 15a, 15b, 15c, 15d, 15e) are entirely covered by the inner shell surface (11) and located between the inner shell surface (11) and the core surface (7).
13. The building aperture cover frame (1) according to any of the items 9-12, wherein the metal reinforcement element(s) (14, 15, 15a, 15b, 15c, 15d, 15e) are sandwiched between the insulating core (6) and the profile shell (10), e.g. such that a layered section of the frame profile (2, 2a, 2b, 2c, 2d, 3a, 3b, 3c, 3d, 4a, 4b, 4c, 4d) is provided, which comprises a first layer provided by the profile shell (10), a second layer provided by the metal reinforcement element (14, 15, 15a, 15b, 15c, 15d, 15e) and a third layer provided by the insulating core (6), when viewed from the outermost surface of the frame profile (2, 2a, 2b, 2c, 2d, 3a, 3b, 3c, 3d, 4a, 4b, 4c, 4d) towards the centre of the frame profile (2, 2a, 2b, 2c, 2d, 3a, 3b, 3c, 3d, 4a, 4b, 4c, 4d).
14. The building aperture cover frame (1) according to any of the items 9-13, wherein the entire extent of each metal reinforcement element (14, 15, 15a, 15b, 15c, 15d, 15e) is sandwiched between the insulating core (6) and the profile shell (10).
15. The building aperture cover frame (1) according to any of the items 9-14, wherein the metal reinforcement element(s) (14, 15, 15a, 15b, 15c, 15d, 15e) comprises one or more metal plate(s) (15, 15a, 15b, 15c, 15d, 15e), wherein each metal plate (15, 15a, 15b, 15c, 15d, 15e) comprises a first major surface (16a) arranged in parallel with an opposing part of the inner shell surface (11).
16. The building aperture cover frame (1) according to any of the items 9-15, wherein the metal reinforcement element(s) (14, 15, 15a, 15b, 15c, 15d, 15e) comprises one or more metal plate(s) (15, 15a, 15b, 15c, 15d, 15e) wherein each metal plate (15, 15a, 15b, 15c, 15d, 15e) comprises a second major surface (16b) arranged in parallel with an opposing part of the core surface (7).
17. The building aperture cover frame (1) according to any of the items 9-16, wherein one or more reinforcement element(s) (14, 15, 15a, 15b, 15c, 15d, 15e), such as one or more metal plate(s) (15, 15a, 15b, 15c, 15d, 15e), comprises one or more bend(s) (17).
18. The building aperture cover frame (1) according to any of the items 9-17, wherein the frame profile (2, 2a, 2b, 2c, 2d, 3a, 3b, 3c, 3d, 4a, 4b, 4c, 4d) comprises a plurality of metal reinforcement elements (14, 15, 15a, 15b, 15c, 15d, 15e), wherein at least some of the metal reinforcement elements (14, 15, 15a, 15b, 15c, 15d, 15e) are of different shapes comprising L-shaped (15b), U-shaped (15a), S-shaped (15d) and/or plate-shaped (15c).

19. The building aperture cover frame (1) according to any of the items 9-18, wherein the frame profile (2, 2a, 2b, 2c, 2d, 3a, 3b, 3c, 3d, 4a, 4b, 4c, 4d) comprises a plurality of the metal reinforcement elements (14, 15, 15a, 15b, 15c, 15d, 15e) discretely placed in the frame profile (2, 2a, 2b, 2c, 2d, 3a, 3b, 3c, 3d, 4a, 4b, 4c, 4d) and preferably separated by the insulating core (6) and/or the profile shell (10).

20. The building aperture cover frame (1) according to any of the items 9-19, wherein the frame profile (2, 2a, 2b, 2c, 2d, 3a, 3b, 3c, 3d, 4a, 4b, 4c, 4d) may comprise a first metal reinforcement element (14, 15, 15a, 15b, 15c, 15d, 15e) arranged at a first section of the core surface (7) and a second metal reinforcement element (14, 15, 15a, 15b, 15c, 15d, 15e) arranged at a second section of the core surface (7), wherein the first section of the insulating core (6) is arranged opposite to the second section of the insulating core (6).

21. The building aperture cover frame (1) according to any of the items 15-20, wherein the metal reinforcement element(s) (14, 15, 15a, 15b, 15c, 15d, 15e), such as the metal plate(s) (15, 15a, 15b, 15c, 15d, 15e), are of a reinforcement thickness (Tr) of less than 2.0 mm, such as less than 1.2 mm, preferably less than 0.8 mm.

22. The building aperture cover frame (1) according to any of the items 9-21, wherein the metal reinforcement elements (14, 15, 15a, 15b, 15c, 15d, 15e) are attached to the core surface (7) by an adhesive (18) preferably comprising at least 50% by weight polyurethane, such as at least 70% by weight polyurethane, preferably at least 85% by weight polyurethane.

23. The building aperture cover frame (1) according to any of the preceding items, wherein the profile shell (10) comprises a profile shell thickness (Tp) of less than 3.0 mm, such as less than 2.0 mm, such as less than 1.5 mm, preferably less than 1.0 mm.

24. The building aperture cover frame (1) according to any of the preceding items, wherein, the profile shell thickness (Tp) may be less than 2.5 mm, such as less than 1.8 mm, such as less than 1.1 mm, preferably less than 0.7 mm.

25. The building aperture cover frame (1) according to any of the preceding items, wherein at least 10%, such as at least 20%, or such as at least 30% of the profile shell (10) is of a profile shell thickness (Tp) of less than 3.0 mm, such as less than 2.0 mm, such as less than 1.5 mm, or such as less than 1.0 mm.

26. The building aperture cover frame (1) according to any of the preceding items, wherein at least 25%, such as at least 50%, such as at least 65% or such as at least 75% of the profile shell (10) is of a profile shell thickness (Tp) of less than 3.0 mm, such as less than 2.0 mm, such as less than 1.5 mm, or such as less than 1.0 mm.

27. The building aperture cover frame (1) according to any of the preceding items, wherein at least 85%, such as at least 90%, or such as at least 95% of the profile shell (10) is of a profile shell thickness (Tp) of less than 3.0 mm, such as less than 2.0 mm, such as less than 1.5 mm, or such as less than 1.0 mm.

28. The building aperture cover frame (1) according to any of the preceding items, wherein between 10% and 90%, such as between 20% and 80%, or such as between 30% and 70% or such as between 40% and 60% of the profile shell (10) is of a profile shell thickness (Tp) of less than 3.0 mm, such as less than 2.0 mm, such as less than 1.5 mm, or such as less than 1.0 mm.

29. The building aperture cover frame (1) according to any of the preceding items, wherein the profile shell (10) has a first profile shell thickness (Tp) of less than 3 mm, such as less than 2 mm, such as less than 1.5 mm or such as less than 1 mm, and a second profile shell thickness (Tp), which is between 2 and 8 times larger than the first profile shell thickness (Tp), such as between 2 and 6 times larger than the first profile shell thickness (Tp), or such as between 2 and 4 times larger than the first profile shell thickness (Tp).

30. The building aperture cover frame (1) according to item 29, wherein between 1% and 50%, such as between 2% and 40%, or such as between 3% and 35% of the profile shell (10) is of a first profile shell thickness (Tp) while between 50% and 99%, such as between 60% and 98%, or such as between 65% and 97% of the profile shell (10) is of a second profile shell thickness (Tp).

31. The building aperture cover frame (1) according to any of the preceding items, wherein the insulating polyurethane foam core material has a thermal conductivity is between 0.020 and 0.060 W/mK, such as between 0.020 and 0.040, preferably between 0.020 and 0.030 W/mk.

32. The building aperture cover frame (1) according to any of the preceding items, wherein the content of reinforcement material being different from polyurethane foam material is less than 5% by weight and/or by weight per unit volume, such as less than 4% by weight and/or by weight per unit volume, such as less than 3% by weight and/or by weight per unit volume, such as less than 2% by weight and/or by weight per unit volume, or such as less than 1% by weight and/or by weight per unit volume.

33. The building aperture cover frame (1) according to any of the preceding items, wherein the content of fibres, such as reinforcement fibres, in the profile shell is less than 3% by weight and/or by weight per unit volume, such as less than 2% by weight and/or by weight per unit volume, or such as less than 1% by weight and/or by weight per unit volume.

34. The building aperture cover frame (1) according to any of the preceding items, wherein the content of insulating foam material being different from polyurethane foam material is less than 5% by weight and/or by weight per unit volume, such as less than 4% by weight and/or by weight per unit volume, such as less than 3% by weight and/or by weight per unit volume, such as less than 2% by weight and/or by weight per unit volume, or such as less than 1% by weight and/or by weight per unit volume.

35. The building aperture cover frame (1) according to any of the preceding items, wherein the content of expanded polystyrene (EPS) foam in the insulated core is less than 3% by weight and/or by weight per unit volume, such as less than 2% by weight and/or by weight per unit volume, such as less than 1% by weight and/or by weight per unit volume.

36. The building aperture cover frame (1) according to any of the preceding items, wherein the profile shell (10) is a reaction injection moulded (RIM) profile shell.

37. The building aperture cover frame (1) according to any of the preceding items, the insulating core (6) is a reaction injection moulded (RIM) insulating core.

38. The building aperture cover frame (1) according to any of the preceding items, wherein the reaction injection moulding (RIM) process provides a bond between the insulating core (6) and the metal reinforcement elements (14) with the profile shell (10).

39. The building aperture cover frame (1) according to any of the preceding items, wherein the building aperture cover frame (1) comprises a fixation frame (4) comprising one or more frame profiles (2, 4a, 4b, 4c, 4d) and a sash frame (3) comprising one or more frame profiles (2, 3a, 3b, 3c, 3d), and wherein the sash frame (3) is movably connected by a hinge arrangement (20) to the fixation frame (4).

40. The building aperture cover frame (1) according to item 39, wherein the hinge arrangement (20) is arranged to engage with one or more metal reinforcement element(s) (14) of the frame profile (2, 2a, 2b, 2c, 2d, 3a, 3b, 3c, 3d, 4a, 4b, 4c, 4d) located in the sash frame (3) and/or in the fixation frame (4).

41. The building aperture cover frame (1) according to item 39 or 40, wherein the hinge arrangement (20) is arranged to engage with hinge position(s) (20a) in the frame profile (2, 2a, 2b, 2c, 2d, 3a, 3b, 3c, 3d, 4a, 4b, 4c, 4d), wherein one or more metal reinforcement element(s) (14) extend in the frame profile (2, 2a, 2b, 2c, 2d, 3a, 3b, 3c, 3d, 4a, 4b, 4c, 4d) and overlap the hinge position(s) (20a).

42. The building aperture cover frame (1) according to any the items 9-41, wherein at least 95%, such as at least 97% or such as at least 99% of an interior cavity of the profile shell (10), enclosed by the inner shell surface (11), is filled, preferably by the insulating core (6) or the insulating core (6) and the metal reinforcement element(s) (14, 15, 15a, 15b, 15c, 15d, 15e).

43. The building aperture cover frame (1) according to any of the items 9-42, wherein the metal reinforcement element(s) (14, 15, 15a, 15b, 15c, 15d, 15e) are made of phosphate coated steel.

44. The building aperture cover frame (1) according to any of the preceding items, wherein the insulating core (6) consists of at least 85%, such as at least 87%, such as at least 90%, such as at least 92% or such as 95% polyurethane foam.

45. The building aperture cover frame (1) according to any of the preceding items, wherein the profile shell (10) consists of at least 90%, such as at least 92%, such as at least 95%, such as at least 98% or such as 100% polyurethane foam.

46. A method of manufacturing a frame profile (2, 2a, 2b, 2c, 2d, 3a, 3b, 3c, 3d, 4a, 4b, 4c, 4d) for a building aperture cover frame (1), wherein the frame profile (2, 2a, 2b, 2c, 2d, 3a, 3b, 3c, 3d, 4a, 4b, 4c, 4d) is provided by the methods steps of:
   a) providing an insulating core (6) of insulating polyurethane (PUR) foam core material enclosed by a core surface (7) of the insulating core,
   b) providing a profile shell (10) of polyurethane encapsulating the insulating core (6), wherein the profile shell (10) is provided by a reaction injection moulding process.

47. The method according to item 46, wherein the method further comprises the step of placing one or more metal reinforcement element(s) (14, 15, 15a, 15b, 15c, 15d, 15e) on the core surface (7) such as placing the metal reinforcement element(s) (14, 15, 15a, 15b, 15c, 15d, 15e) on the core surface (7) prior to the method step of providing the profile shell (10) encapsulating the insulating core (6).

48. The method according to any of the items 46-47, wherein the reinforcement element(s) (14, 15, 15a, 15b, 15c, 15d, 15e) are fixed to the core surface (7) by means of an adhesive (18), preferably a polyurethane (PUR) adhesive, prior to the method step of providing the profile shell (10) encapsulating the insulating core (6).

49. The method according to any of the items 46-48, wherein the method step b) further provides as profile shell (10) having a profile shell thickness (Tp) below 3 mm, such as below 2 mm, such as below 1 mm or such as below 0.8 mm.

50. The method according to any of the items 46-49, wherein the method step b) further provides as profile shell (10) of non-uniform thicknesses between 0.3 and 8 mm, such as between 0.5 and 7 mm, such as between 0.7 and 6 mm.

51. The method according to any of the items 46-50, wherein the method provides a building aperture cover frame (1) according to any of the items 1-45.

52. A frame profile (2, 2a, 2b, 2c, 2d, 3a, 3b, 3c, 3d, 4a, 4b, 4c, 4d) for framing an insulated glass (IG) unit (1a) in a building aperture cover frame (1), such as a window frame, wherein the frame profile (2, 2a, 2b, 2c, 2d, 3a, 3b, 3c, 3d, 4a, 4b, 4c, 4d) comprises
   an insulating core (6) of an insulating polyurethane (PUR) foam core material enclosed by a core surface (7) of the insulating core, and
   a profile shell (10) made of polyurethane (PUR) material, wherein the profile shell (10) encapsulates the insulating core (6) and comprises an inner shell surface (11) facing the core surface (7).

53. A frame profile (2, 2a, 2b, 2c, 2d, 3a, 3b, 3c, 3d, 4a, 4b, 4c, 4d) for framing an insulated glass (IG) unit (1a) in a building aperture cover frame (1), such as a window frame, wherein the frame profile (2, 2a, 2b, 2c, 2d, 3a, 3b, 3c, 3d, 4a, 4b, 4c, 4d) comprises
   an insulating core (6) of insulating polyurethane (PUR) foam core material enclosed by a core surface (7) of the insulating core, wherein the insulating polyurethane (PUR) foam core material is made of at least 85% by weight polyurethane foam, such as at least 90% by weight polyurethane foam, or such as at least 95% by weight polyurethane foam, and
   wherein the insulating polyurethane foam core material is of a material density ($\delta_{core}$) of less than 60 kg/m$^3$, such as less than 50 kg/m$^3$, preferably less than 40 kg/m$^3$,
   a profile shell (10) encapsulating the insulating core (6) and comprising an inner shell surface (11) facing the core surface (7), wherein the profile shell (10) is made of at least 90% by weight polyurethane, such as at least 95% by weight polyurethane, or such as at least 98% by weight polyurethane, and
   wherein the profile shell (10) is of a material density ($\delta_{shell}$) of at least 600 kg/m$^3$, such as at least 750 kg/m$^3$, preferably at least 850 kg/m$^3$,
   one or more metal reinforcement element(s) (14, 15, 15a, 15b, 15c, 15d, 15e), such as one or more steel reinforcement element(s), wherein the metal reinforcement element(s) (14, 15, 15a, 15b, 15c, 15d, 15e) are located between opposing parts of the inner shell surface (11) and the core surface (7).

54. The frame profile (2, 2a, 2b, 2c, 2d, 3a, 3b, 3c, 3d, 4a, 4b, 4c, 4d) according to item 52 or 53, wherein the frame profile (2, 2a, 2b, 2c, 2d, 3a, 3b, 3c, 3d, 4a, 4b, 4c, 4d) comprises one or more features according to any of the items 1-45.

REFERENCE LIST 1 building aperture cover frame, e.g. window frame
1a glass unit, e.g. insulated glass unit
1b peripheral seal of glass unit
1c first outer major surface of glass unit
1d second outer major surface of glass unit2 frame profile
2a top profile
2b bottom profile
2c first side profile
2d second side profile
3 sash frame
3a top sash frame profile
3b bottom sash frame profile
3c first side sash frame profile
3d second side sash frame profile
4 fixation frame
4a top fixation frame profile
4b bottom fixation frame profile
4c first side fixation frame profile
4d second side fixation frame profile
5 cover elements
5a sealing/attachment elements
5b gasket
5c holding element
6 insulating core
6a first insulating core part
6b second insulating core part
7 core surface
10 profile shell
10w profile shell wall
10w1 first profile shell wall
11 inner shell surface
12 outer shell surface
12_1 outer shell surface of first profile shell wall
13 inner profile shell cavity
13a first inner cavity part
13b second inner cavity part
14 metal reinforcement element
14w metal reinforcement wall part
15 metal plate
15a U-shaped metal plate
15b L-shaped metal plate
15c Plate-shaped metal plate
15d S-shaped metal plate
15e metal plate comprising a plurality of bends
16a first reinforcement surface
16b second reinforcement surface
17 metal plate bend
18 adhesive
19 frame opening
20 hinge arrangement
20a hinge position
21 handle assembly
22 roof of a building
Tr reinforcement thickness
Tp profile shell thickness
RAX axis of rotation
Ls longitudinal extent of a side frame profile
Lb longitudinal extent of a bottom frame profile

The invention claimed is:

1. A building aperture cover frame, comprising at least one frame profile for framing an insulated glass unit, wherein the frame profile comprises;
an insulating core of insulating polyurethane foam core material enclosed by a core surface of the insulating core, wherein the insulating polyurethane foam core material comprises at least 85% by weight polyurethane, and wherein the insulating polyurethane foam core material is of a material density of less than 60 kg/m$^3$,
a profile shell encapsulating the insulating core and comprising an inner shell surface facing the core surface, wherein the profile shell is made of at least 90% by weight polyurethane, and wherein the profile shell is of a material density of at least 600 kg/m$^3$, and
one or more metal reinforcement element(s) located between opposing parts of the inner shell surface and the core surface;
wherein a content of fibres in the profile shell is less than 3% by weight and/or by weight per unit volume.

2. The building aperture cover frame according to claim 1, wherein the insulating polyurethane foam core material is of a material density of less than 50 kg/m$^3$.

3. The building aperture cover frame according to claim 1, wherein the profile shell is of a material density of at least 750 kg/m$^3$.

4. The building aperture cover frame according to claim 1, wherein the metal reinforcement element(s) are made of steel.

5. The building aperture cover frame according to claim 4, wherein the metal reinforcement element(s) are made of phosphate coated steel.

6. The building aperture cover frame according to claim 1, wherein the entire extent of each metal reinforcement element is sandwiched between the insulating core and the profile shell.

7. The building aperture cover frame according to claim 1, wherein the metal reinforcement elements are elongated metal reinforcement elements having a longitudinal extent arranged along a longitudinal extent of the profile shell.

8. The building aperture cover frame according to claim 1, wherein the metal reinforcement element(s) comprises one or more metal plate(s), wherein each metal plate comprises a first major surface arranged in parallel with an opposing part of the inner shell surface.

9. The building aperture cover frame according to claim 8, wherein the metal plate(s) are of a reinforcement thickness of less than 2.0 mm.

10. The building aperture cover frame according to claim 8, wherein the metal plate(s) are of a reinforcement thickness of less than 1.2 mm.

11. The building aperture cover frame according to claim 1, wherein the metal reinforcement elements are attached to the core surface by an adhesive.

12. The building aperture cover frame according to claim 11, wherein the adhesive comprises at least 50% by weight polyurethane.

13. The building aperture cover frame according to claim 1, wherein the profile shell comprises a profile shell thickness of less than 3.0 mm.

14. The building aperture cover frame according to claim 1, wherein at least 25% of the profile shell is of a profile shell thickness of less than 3.0 mm.

15. The building aperture cover frame according to claim 1, wherein the insulating polyurethane foam core material has a thermal conductivity between 0.020 and 0.060 W/mK.

16. The building aperture cover frame according to claim 1, wherein the profile shell is a reaction injection moulded profile shell.

17. The building aperture cover frame according to claim 1, comprising a fixation frame comprising one or more frame profiles and a sash frame comprising one or more frame profiles, and wherein the sash frame is movably connected by a hinge arrangement to the fixation frame.

18. The building aperture cover frame according to claim 17, wherein the hinge arrangement is arranged to engage with hinge position(s) in the frame profile, wherein one or more metal reinforcement element(s) extend in the frame profile and overlap the hinge position(s).

19. A method of manufacturing the frame profile of claim 1, comprising:
   a) providing the insulating core of insulating polyurethane foam core material enclosed by the core surface of the insulating core,
   b) placing the one or more metal reinforcement element(s) on the core surface,
   c) providing the profile shell of polyurethane encapsulating the insulating core, wherein the profile shell is provided by a reaction injection moulding process.

\* \* \* \* \*